United States Patent
Seo et al.

(10) Patent No.: US 10,866,672 B2
(45) Date of Patent: Dec. 15, 2020

(54) SIGNAL TRANSMISSION DEVICE AND DISPLAY USING THE SAME

(71) Applicant: LG Display Co., Ltd., Seoul (KR)

(72) Inventors: Seungpyo Seo, Paju-si (KR); Yeonwook Kang, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 16/547,214

(22) Filed: Aug. 21, 2019

(65) Prior Publication Data

US 2020/0097112 A1 Mar. 26, 2020

(30) Foreign Application Priority Data

Sep. 20, 2018 (KR) .......................... 10-2018-0113163

(51) Int. Cl.
  *G06F 3/041* (2006.01)
  *G06F 3/044* (2006.01)
  *G09G 3/20* (2006.01)
(52) U.S. Cl.
  CPC ............ *G06F 3/0412* (2013.01); *G06F 3/044* (2013.01); *G06F 3/04164* (2019.05); *G06F 3/04166* (2019.05); *G09G 3/20* (2013.01); *G09G 2310/08* (2013.01)
(58) Field of Classification Search
  CPC ............... G06F 3/0412; G06F 3/04166; G06F 3/04164; G06F 3/044; G09G 3/20
  See application file for complete search history.

(56) References Cited

U.S. PATENT DOCUMENTS

| 8,330,699 | B2 | 12/2012 | Hong et al. |
| 9,329,739 | B2 | 5/2016 | Jang |
| 9,857,911 | B1* | 1/2018 | Qu .................. G06F 3/0416 |
| 10,120,432 | B2 | 11/2018 | Jang |
| 10,438,553 | B2* | 10/2019 | Kuei .................. G09G 3/3611 |
| 2009/0237395 | A1* | 9/2009 | Lee .................. G09G 3/20 345/214 |
| 2010/0148829 | A1 | 6/2010 | Hong et al. |
| 2014/0132558 | A1 | 5/2014 | Jang |

(Continued)

FOREIGN PATENT DOCUMENTS

| KR | 10-2010-0068938 A | 6/2010 |
| KR | 10-2014-0060991 A | 5/2014 |

(Continued)

*Primary Examiner* — Sardis F Azongha
(74) *Attorney, Agent, or Firm* — Fenwick & West LLP

(57) ABSTRACT

A signal transmission device for transmitting touch data and a display device using the same are disclosed. The signal transmission device includes a plurality of integrated circuits driving touch sensors and outputting touch data obtained from the touch sensors, a controller controlling the integrated circuits and determining a touch input on the basis of the touch data received from the integrated circuits; and a plurality of lines connecting the controller and the integrated circuits in a multi-point manner. The controller and the integrated circuits communicate with each other in both directions via the lines. A data packet of differential signal transmitted between the controller and the integrated circuits includes a header interval, a register address interval, and a data interval allocated between a start dummy clock and an end dummy clock.

12 Claims, 25 Drawing Sheets

(56) References Cited

U.S. PATENT DOCUMENTS

| | | | |
|---|---|---|---|
| 2015/0309649 A1* | 10/2015 | Lee | G09G 3/20 |
| | | | 345/173 |
| 2016/0125840 A1* | 5/2016 | Oh | G09G 5/008 |
| | | | 345/213 |
| 2016/0224095 A1 | 8/2016 | Jang | |
| 2018/0150168 A1* | 5/2018 | Jung | H03M 1/12 |
| 2019/0155432 A1* | 5/2019 | Park | G06F 3/0412 |
| 2019/0317630 A1* | 10/2019 | Shaw | G06F 3/0412 |

FOREIGN PATENT DOCUMENTS

| | | |
|---|---|---|
| KR | 10-2017-0049668 A | 5/2017 |
| KR | 10-2018-0003973 A | 1/2018 |
| KR | 10-2018-0075168 A | 7/2018 |

* cited by examiner

FIG. 10

| Start Dummy Clock | Header (16bit) | Register Address (16bit) | Data (32bit * n) | End Dummy Clock |
|---|---|---|---|---|

FIG. 14

| TX \ RX | MCU | ROIC #1 | ROIC #2 | ROIC #3 | ROIC #4 |
|---|---|---|---|---|---|
| MCU | ▨ | | | | |
| ROIC #1 | | ▨ | | | |
| ROIC #2 | | | ▨ | | |
| ROIC #3 | | | | ▨ | |
| ROIC #4 | | | | | ▨ |

RX Status

| Active | IDLE |
|---|---|
| | ▨ |

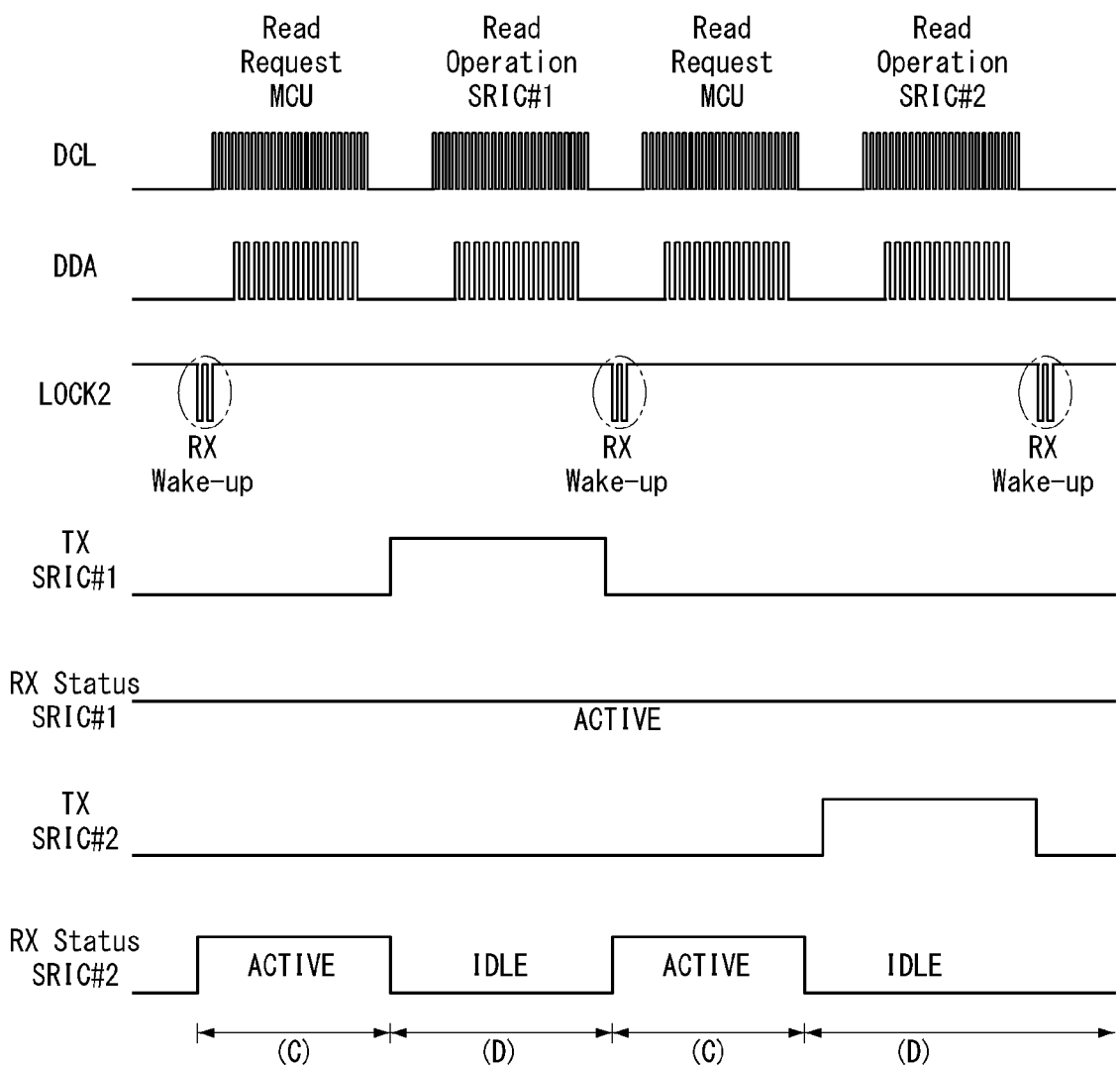

| SSN | MCU | ROIC | ROIC RX Buffer |
|-----|-----|------|----------------|
| 0   | TX  | RX   | Active         |
| 1   | RX  | TX   | IDLE           |

| TX \ RX | MCU | ROIC #1 | ROIC #2 | ROIC #3 | ROIC #4 |
|---|---|---|---|---|---|
| MCU | ▨ | | | | |
| ROIC #1 | | ▨ | ▨ | ▨ | ▨ |
| ROIC #2 | | ▨ | ▨ | ▨ | ▨ |
| ROIC #3 | | ▨ | ▨ | ▨ | ▨ |
| ROIC #4 | | ▨ | ▨ | ▨ | ▨ |

RX Status

| Active | IDLE |
|---|---|

——— DCL
━━━ DDA

|  | ROIC#1 RX | ROIC#2 RX | ROIC#3 RX | ROIC#4 RX | MCU RX |
|---|---|---|---|---|---|
| WHEN MCU IS IN TX MODE | ～ | ～ | ～ | ～ | ▨ |
| WHEN ROIC#1 IS IN TX MODE | ▨ | ▨ | ▨ | ▨ | ～ |
| WHEN ROIC#2 IS IN TX MODE | ▨ | ▨ | ▨ | ▨ | ～ |
| WHEN ROIC#3 IS IN TX MODE | ▨ | ▨ | ▨ | ▨ | ～ |
| WHEN ROIC#4 IS IN TX MODE | ▨ | ▨ | ▨ | ▨ | ～ |

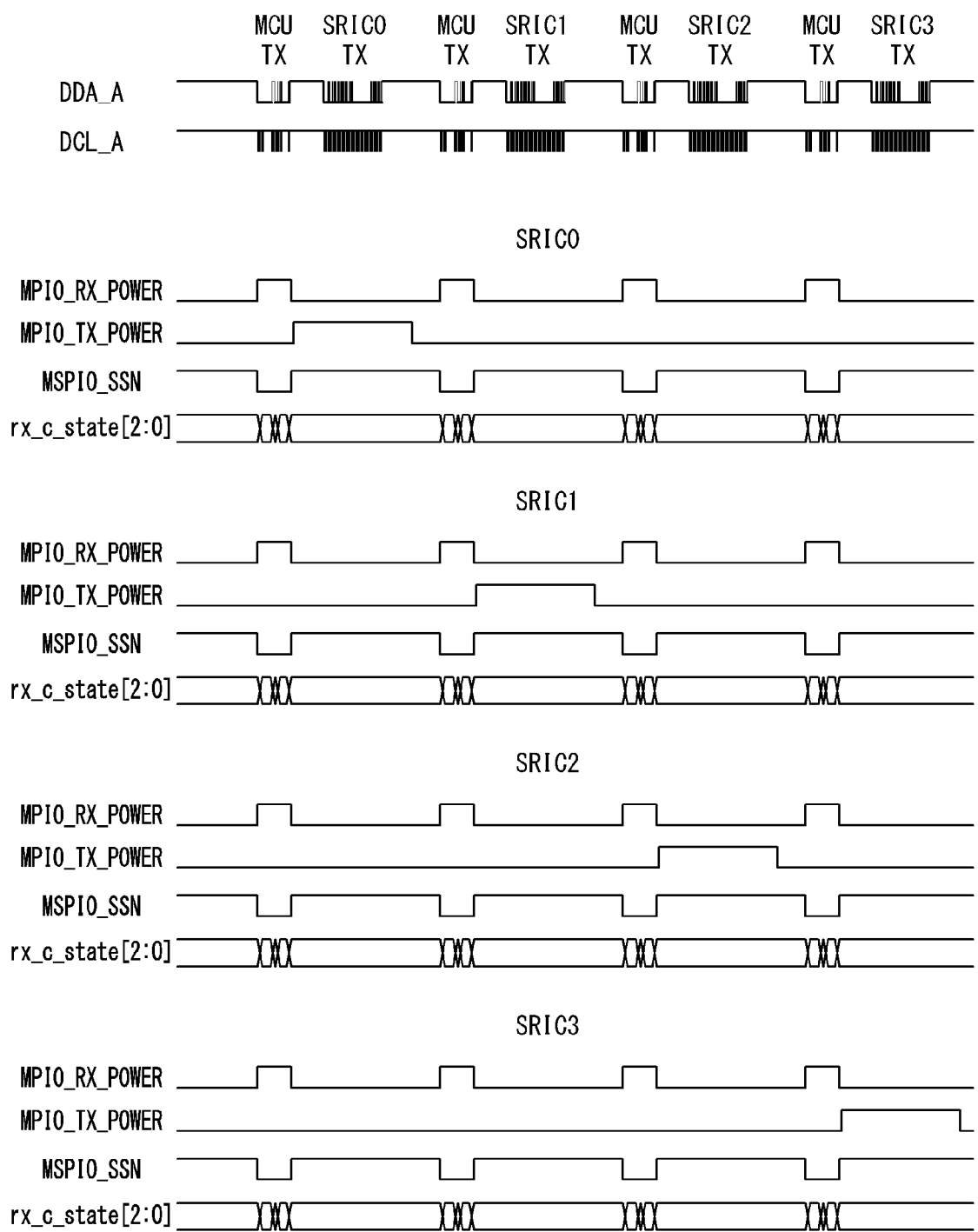

SIGNAL TRANSMISSION DEVICE AND DISPLAY USING THE SAME

CROSS-REFERENCE TO RELATED APPLICATIONS

This application claims the benefit of Republic of Korea Patent Application No. 10-2018-0113163 filed on Sep. 20, 2018, which is incorporated herein by reference in its entirety.

BACKGROUND

Field of Technology

The present disclosure relates to a signal transmission device for transmitting touch data and a display device using the same.

Related Art

A user interface (UI) enables a user to communicate with various electric or electronic devices to easily control the devices as desired. Typical examples of the user interface include a keypad, a keyboard, a mouse, an on-screen display (OSD), a remote controller having infrared communication or radio frequency (RF) communication function. The user interface technology has been developed to enhance the user's sensibility and ease of operation. Recently, the user interface has evolved into a touch UI, a voice recognition UI, a 3D UI, and the like.

The touch UI implements a touch screen on a display panel to detect a touch input and transmit the detected user input to an electronic device. The touch UI is essentially adopted in portable information devices such as smartphones, and is extensively applied to notebook computers, computer monitors, and home appliances.

A touch screen including an in-cell touch sensor may be formed on a display panel. The in-cell touch sensor refers to a touch sensor built in a pixel array of the display panel. The touch sensors may be implemented as capacitive touch sensors.

The display device includes a data driver supplying a data voltage to data lines of the display panel, a gate driver (or a scan driver) supplying a gate pulse (or a scan pulse) to gate lines of the display panel, and a touch sensor driver sensing a touch input by driving touch sensors.

SUMMARY

The touch sensor driver may include a read-out integrated circuit (ROIC) including a touch sensing unit and a micro-control unit (MCU). The touch sensing unit converts a change in capacitance before and after a touch input into digital data on the basis of a change in signal of the touch sensors. The digital data output from the ROIC is touch-raw data (hereinafter referred to "touch data"). The ROIC may be integrated with the data driver of the display device.

The MCU compares the touch data with a predetermined threshold value, determines touch data having the threshold value or greater as a touch input, and outputs a touch report including coordinate information of each of positions of touch inputs. The ROIC and the MCU perform data communication through a serial peripheral interface (SPI). Here, such a SPI has the following problems.

The SPI transmits data by a transistor-transistor logic (TTL) voltage. In the SPI, a master and multiple slaves are connected in a point-to-point manner. In the SPI, the master is the MCU and the slaves are the ROIC. Multiple lines are needed between the master and the slaves for related art SPI communication. ROICs are increased in a large-area high-resolution display device. In this case, the number of lines between the MCU and ROICs increases rapidly. The related art SPI has a large number of pins of the MCU, and as the number of ROICs increases, the number of pins of the MCU also increases, resultantly increasing a MCU package.

In the related art SPI, a TTL signal transmission method is significantly affected by electromagnetic interference (EMI), signal distortion due to EMI is severe.

The present invention provides a signal transmission device capable of reducing the number of lines required for bidirectional communication for transmitting touch data, reducing a size of an MCU package, and improving EMI characteristics, and a display device using the same.

In an aspect, a signal transmission device includes a plurality of integrated circuits driving touch sensors and outputting touch data obtained from the touch sensors, a controller controlling the integrated circuits and determining a touch input on the basis of the touch data received from the integrated circuits; and a plurality of lines connecting the controller and the integrated circuits in a multi-point manner. The controller and the integrated circuits communicate with each other in both directions via the lines. A data packet of differential signal transmitted between the controller and the integrated circuits includes a header interval, a register address interval, and a data interval allocated between a start dummy clock and an end dummy clock. The header interval defines a reception mode and a transmission mode of the integrated circuits and the controller and a data length to be transmitted in the data interval. The register address interval defines a read or write start address of the data to be transmitted in the data interval.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings:

FIGS. 10 and 11 are views illustrating a data packet configuration defined in a two-way communication protocol between an MCU and a plurality of SRICs according to an embodiment of the present disclosure.

FIG. 14 is a view illustrating an example of setting a transmission mode and a reception mode in a two-way communication method between an MCU and SRICs according to an embodiment of the present disclosure.

FIG. 22 is a waveform view illustrating an example of controlling ON/OFF of an RX clock buffer using a lock signal according to an embodiment of the present disclosure.

FIG. 27 is a view illustrating a simulation of the embodiment illustrated in FIGS. 23 to 26.

DETAILED DESCRIPTION

Figure 1:
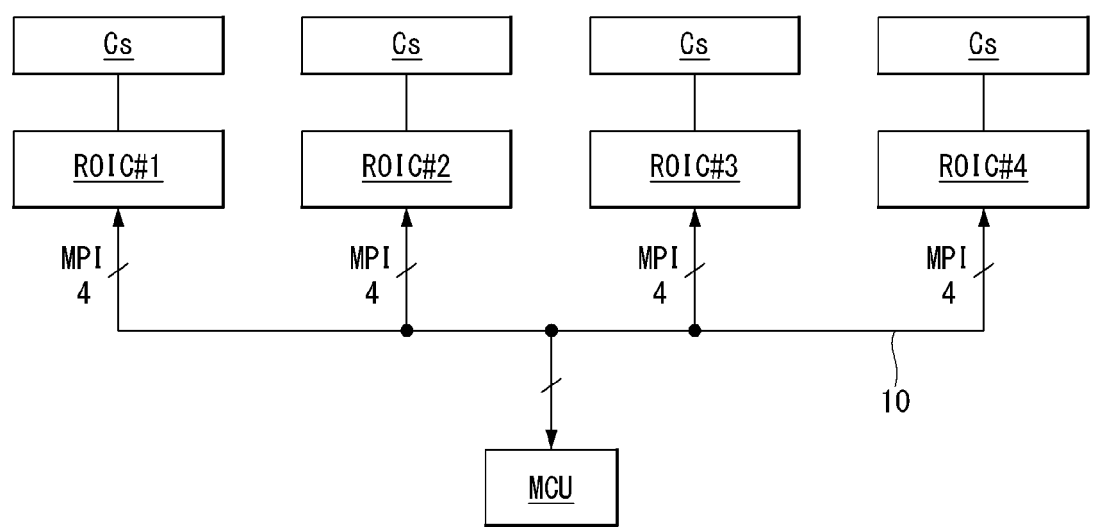
FIG. 1 is a view illustrating a signal transmission device according to an embodiment of the present disclosure.

Advantages and features of the present disclosure, and methods for accomplishing the same will be more clearly understood from exemplary embodiments described below with reference to the accompanying drawings. However, the present disclosure is not limited to the following exemplary embodiments but may be implemented in various different forms. The exemplary embodiments are provided only to complete disclosure of the present disclosure and to fully provide a person having ordinary skill in the art to which the present disclosure pertains with the category of the disclosure, and the present disclosure will be defined by the appended claims.

The shapes, sizes, ratios, angles, numbers, and the like illustrated in the accompanying drawings for describing the exemplary embodiments of the present disclosure are merely examples, and the present disclosure is not limited thereto. Like reference numerals generally denote like elements throughout the present specification. Further, in the following description, a detailed explanation of known related technologies may be omitted to avoid unnecessarily obscuring the subject matter of the present disclosure.

The terms such as "including," "having," and "comprising" used herein are generally intended to allow other components to be added unless the terms are used with the term "only". Any references to singular may include plural unless expressly stated otherwise.

Components are interpreted to include an ordinary error range even if not expressly stated.

In describing a position relationship, for example, when two portions are described as "~on", "~above", "~below", or "~on the side", one or more other portions may be positioned between the two portions unless "immediately" or "directly" is used.

It will be understood that, although the terms "first", "second", etc. may be used herein to describe various elements, these elements should not be limited by these terms.

The features of various embodiments of the present disclosure can be partially or entirely bonded to or combined with each other and can be interlocked and operated in technically various ways as can be fully understood by a person having ordinary skill in the art, and the embodiments can be carried out independently of or in association with each other.

In a display device of the present disclosure, a pixel array, a gate driver, and the like, may include a plurality of transistors mounted on a display panel. A circuit mounted on the display panel may include at least one of an n-channel transistor (NMOS) and a p-channel transistor (PMOS). A transistor is a three-electrode element including a gate, a source, and a drain. The source is an electrode that supplies carriers to the transistor. Within the transistor, the carriers start to flow from the source. The drain is an electrode from which the carriers exit from the transistor. In the transistor, the carriers flow from the source to the drain. In the case of an n-channel transistor (NMOS), since the carriers are electrons, a source has a voltage lower than that of a drain so that electrons may flow from the source to the drain. In the n-channel transistor, current flows from the drain toward the source. In the case of a p-channel transistor (PMOS), since the carriers are holes, a source has a voltage higher than that of a drain so that holes may flow from the source to the drain. In the p-channel transistor, current flows from the source to the drain because the holes flow from the source to the drain. It should be noted that the source and drain of the transistor are not fixed. For example, the source and the drain may be changed depending on an applied voltage. Therefore, the disclosure is not limited by the source and the drain of the transistor. In the following description, the source and the drain of the transistor will be referred to as first and second electrodes.

A voltage of a gate pulse or a switch control signal controlling the transistors mounted on the display panel swing between a gate-on voltage and a gate-off voltage. The gate-on voltage is set to a voltage higher than a threshold voltage of the transistor, and the gate-off voltage is set to a voltage lower than the threshold voltage of the transistor. The transistor is turned on in response to the gate-on voltage, while it is turned off in response to the gate-off voltage. In the case of the n-channel transistor, the gate-on voltage may be a gate high voltage (VGH) and the gate-off voltage may be a gate low voltage (VGL). In the case of the p-channel transistor, the gate-on voltage may be the gate low voltage (VGL) and the gate-off voltage may be the gate high voltage (VGH).

The display device of the present disclosure may be implemented as a flat panel display device such as a liquid crystal display (LCD), an organic light emitting display, and the like. In the following embodiments, a liquid crystal display device will be described as an example of the flat panel display device but the present disclosure is not limited thereto.

Touch sensors of the present disclosure may be arranged as an on-cell type or an add-on type on a screen of the display panel or an in-cell touch sensors may be installed in the display panel. Hereinafter, the in-cell touch sensor will be mainly described, but the touch sensor of the present disclosure is not limited thereto.

Referring to FIG. 1, the signal transmission device of the present disclosure transmits and receives touch data through lines 10 connecting a plurality of ROICs ROIC #1 to ROIC #4 and a micro-controller unit (MCU) in a multi-point or multi-drop manner. The touch data is included in a differential signal encoded in accordance with a predetermined protocol MPI and transmitted through the line 10. The differential signal is a voltage having a positive polarity and a negative polarity forming a pair, and is transmitted as a very small voltage relative to a voltage of a TTL signal.

Each of the ROICs ROIC #1 to ROIC #4 drives different touch sensors Cs to output touch data obtained from the touch sensors Cs, respectively. The MCU controls two-way communication with the ROICs ROIC #1 to ROIC #4 and determines a touch input on the basis of the touch data received from the ROICs ROIC #1 to ROIC #4.

A data packet transmitted between the MCU and the ROICs ROIC #1 to ROIC #4 includes a header interval, a register address interval, and a data interval allocated between a start dummy clock and an end dummy clock. The header interval defines a reception mode, a transmission mode, and a data length to be transmitted in the data interval. The register address interval defines a read or write start address of data.

A signal defining an activation interval of at least one of reception buffers of the ROICs may be transmitted through any one of the lines 10 connecting the MCU and the ROICs. The reception buffer is driven in an active mode during the active period to normally receive the signal. A receiver controller connected to a receiver of the ROICs wakes up the reception buffer in response to a specific logical value of a signal received when an operation of the reception buffer is required for the ROICs to operate in a reception mode RX. The reception buffer may be one or more of an RX clock buffer and an RX data buffer. The receiver controller of the ROIC stops driving of the reception buffers by cutting off power at a time when the driving of the reception buffers is not necessary in order to minimize an influence of reflected waves. The receiver controller may monitor the received signal and wake up the RX data buffer when the start dummy clock is received.

Figure 2:
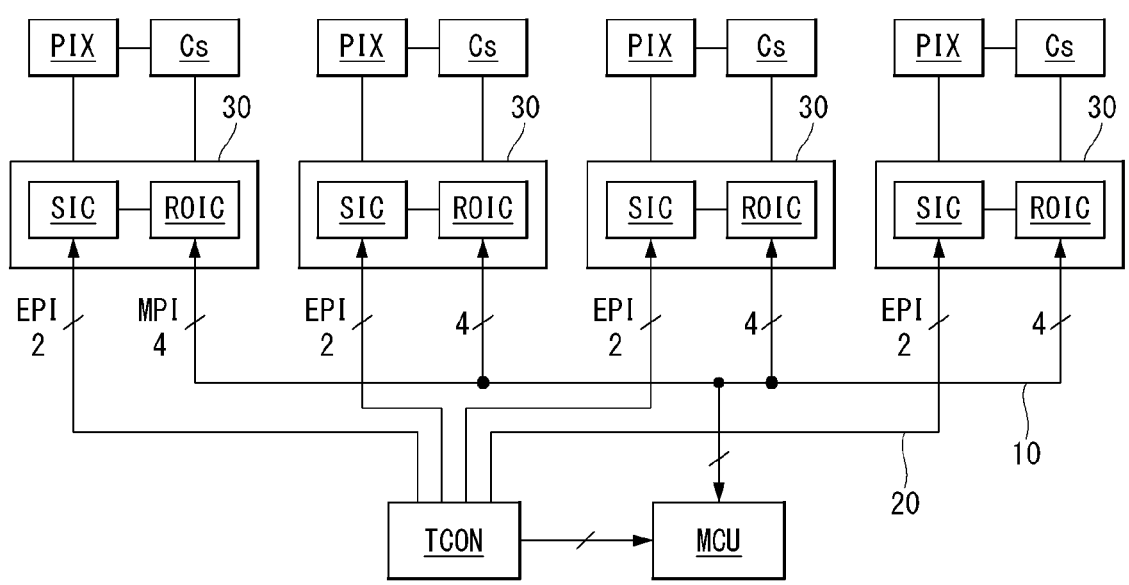
FIG. 2 is a view illustrating an example in which the signal transmission device illustrated in FIG. 1 is applied to an in-cell touch sensor.

Referring to FIG. 2, each of the SRICs 30 includes a ROIC and a source drive IC (SIC) and supplies a data voltage to pixels PIX and drives touch sensors Cs. The SIC converts pixel data of an input image into a data voltage and supplies the converted data voltage to data lines to drive the data lines connected to the pixels PIX. The SIC is an integrated circuit including a data driver 102 illustrated in FIG. 3.

A timing controller TCON receives the pixel data, i.e., digital video data, of the input image and transmits the pixel data to the SIC. The timing controller TCON and the SICs may be connected in a point-to-point manner via lines 20. The timing controller TCON serially transmits the pixel data to each of the SICs through the lines 20. The pixel data is included in a differential signal encoded in accordance with a predetermined protocol EPI and transmitted. The data packet transmitted from the timing controller TCON to the SICs may include a clock, a pre-amble signal for initializing the SICs, control data, pixel data, and the like. The control data may include a timing control signal for controlling an operation timing of the data driver 102 and the gate driver 104.

In the case of an in-cell touch sensor, the touch sensors Cs are embedded in the pixel array so as to be connected to the pixels PIX. A connection relationship between the MCU and the ROICs and the signal transmission method are substantially the same as those of FIG. 1, and thus, a detailed description thereof will be omitted. The timing controller TCON may be synchronized with the MCU by sending a synchronization signal to the MCU.

Figure 3:
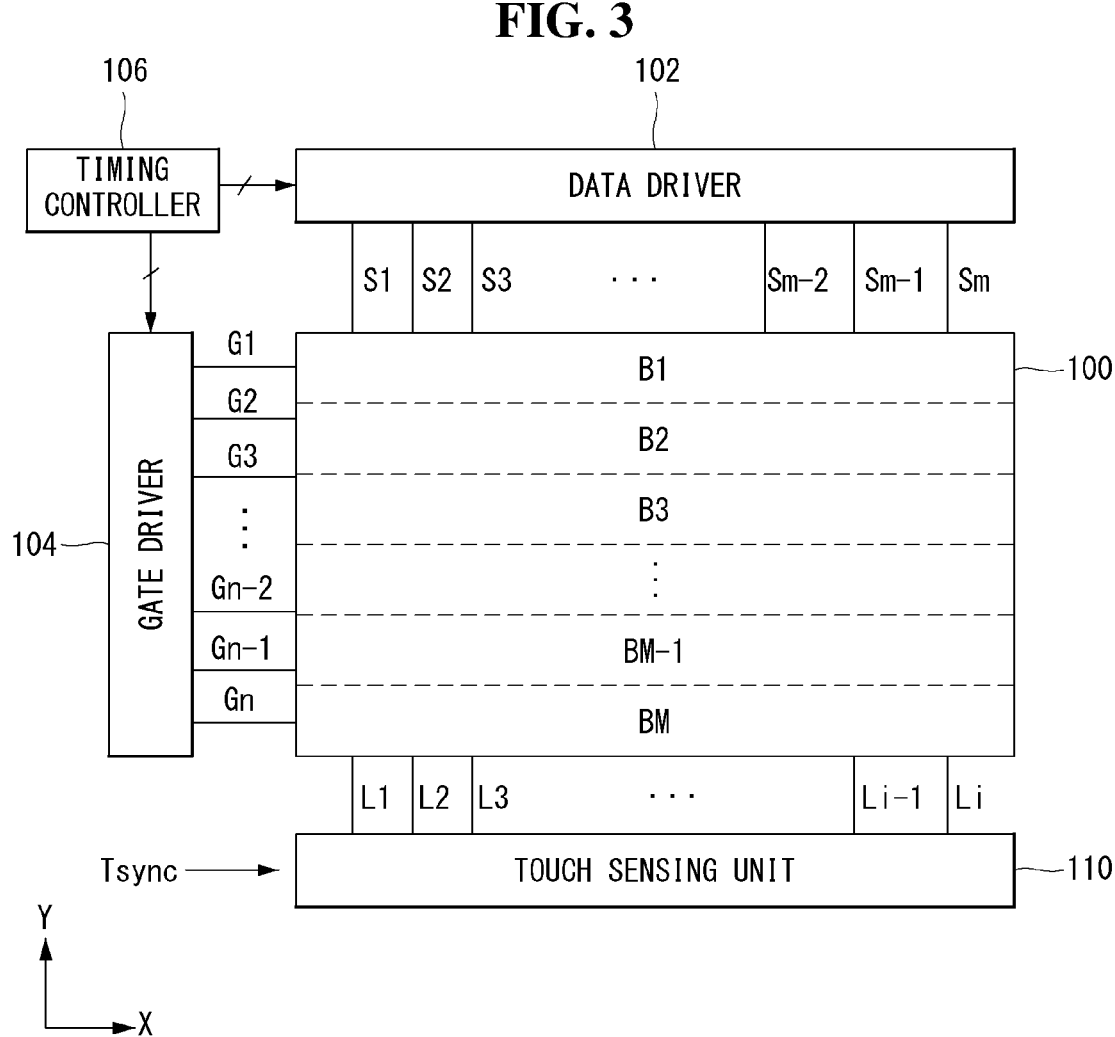
FIG. 3 is a block view illustrating a display device according to an embodiment of the present disclosure.

Referring to FIG. 3, a display device of the present disclosure includes a display panel 100, a display driving circuit (e.g., data driver 102, gate driver 104, and timing controller 106), a touch sensing unit 110, and the like.

One frame period of the display panel 100 may be time-divided into one or more display periods and one or more touch sensing periods. A screen of the display panel 100 includes a pixel array in which an input image is displayed.

The pixel array includes m×n pixels formed in a pixel area defined by m (m is a positive integer) data lines S1 to Sm and n (n is a positive integer) gate lines G1 to Gn. Each of the pixels may include red (R), green (G), and blue (B) subpixels for color representation. Each of the pixels may further include a white (W) subpixel in addition to the RGB subpixels. Hereinafter, a pixel may be interpreted as having the same sense as that of a subpixel. Each of the pixels includes thin film transistors (TFTs) formed at intersections of the data lines S1 to Sm and the gate lines G1 to Gn, a pixel electrode 11 for charging a data voltage, a storage capacitor Cst connected to the pixel electrode 11 and maintaining a data voltage, and the like, and displays an input image. The color arrangement, the structure, and the like, of the subpixels may be modified according to driving characteristics of a flat panel display device.

The pixel array of the display panel 100 further includes touch sensors Cs and sensor lines L1 to Li (i is a positive integer smaller than m and n) connected to touch sensor electrodes C1 to C4. The touch sensor electrodes C1 to C4 may be implemented by a method of dividing a common electrode connected to a plurality of pixels. One touch sensor electrode C1 to C4 is commonly connected to the plurality of pixels to form one touch sensor Cs. The touch sensors Cs supply a common voltage Vcom having the same potential to the pixels during the display period. During the touch sensing period, the touch sensing unit 110 drives the touch sensors Cs to sense a touch input on the screen.

Figure 4:
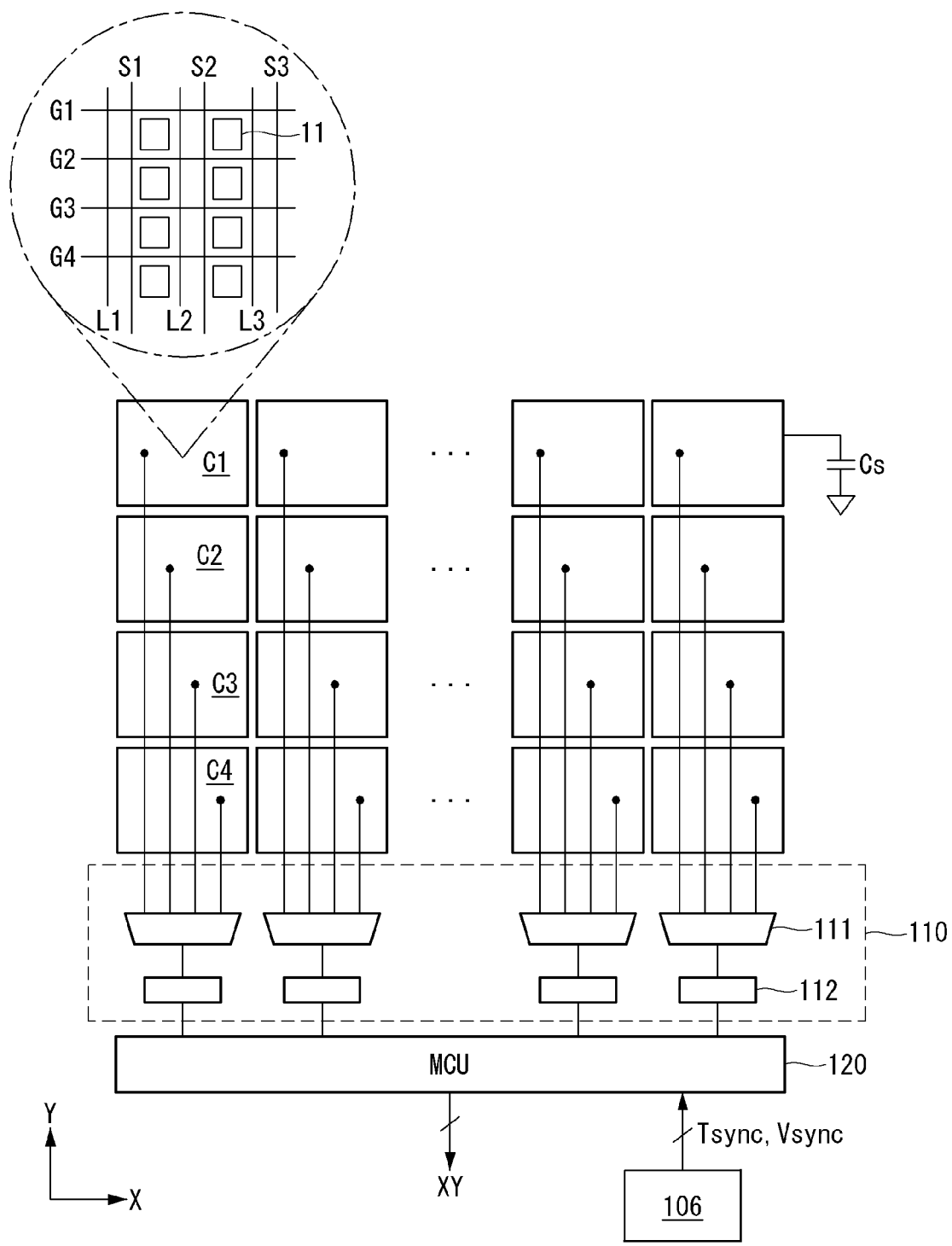
FIG. 4 is a view illustrating a touch sensing unit and an in-cell touch sensor illustrated in FIG. 3 according to an embodiment of the present disclosure.

The touch sensors embedded in the pixel array may be implemented as capacitance type (or capacitive) touch sensors. The capacitance type may be divided into self-capacitance and mutual capacitance. The self-capacitance is formed along a conductive line of a single layer formed in one direction. The mutual capacitance is formed between two orthogonal conductive lines. FIG. 4 illustrates a self-capacitance type touch sensor but touch sensors are not limited thereto.

A polarizing film may be adhered to a top plate and a bottom plate of the display panel 100. A black matrix, a color filter, or the like, may be formed on the top or bottom panel of the display panel 100.

The pixel array may be divided into two or more blocks B1 to BM and separately driven in a time-division manner. The blocks B1 to BM need not be physically divided. The blocks B1 to BM of the display panel 100 are driven in a time division manner with the touch sensing period therebetween. For example, during a first display period, a pixel data voltage of an input image (hereinafter referred to as a "data voltage") is applied to pixels of the first block B1 to drive the pixels. During the first display period, current frame data is written into the pixels of the first block B1. Subsequently, touch sensors are driven during a first touch sensing period to sense a touch input on the screen. During the first touch sensing period, the pixels of the first block B1 maintain the already charged data voltage. During a second display period subsequent to the first touch sensing period, a data voltage is applied to pixels of the second block B2 and the current frame data is written into the pixels. Subsequently, the touch sensors are driven during the second touch sensing period to sense a touch input on the screen.

The display driving circuit includes the data driver 102, the gate driver 104, and the timing controller 106 and writes pixel data of the input image into the pixels of the display panel 100 during the time-divided display period. During the display period, the data driver 102 converts pixel data (digital data) of the input image input from the timing controller 106 into a gamma compensation voltage using a digital-to-analog converter (DAC) to output a data voltage. The data voltage output from the data driver 102 is supplied to the data lines S1 to Sm during the display period.

Figure 5:
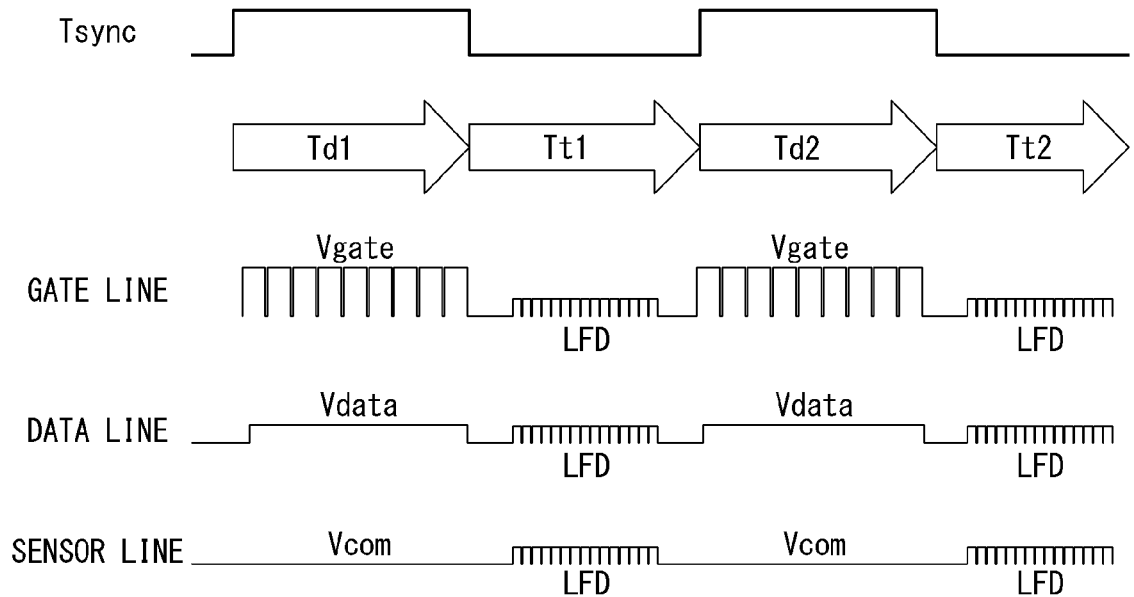
FIGS. 5 and 6 are waveform views illustrating a method of driving pixels and in-cell touch sensors in a time-division manner according to an embodiment of the present disclosure.
Figure 6:
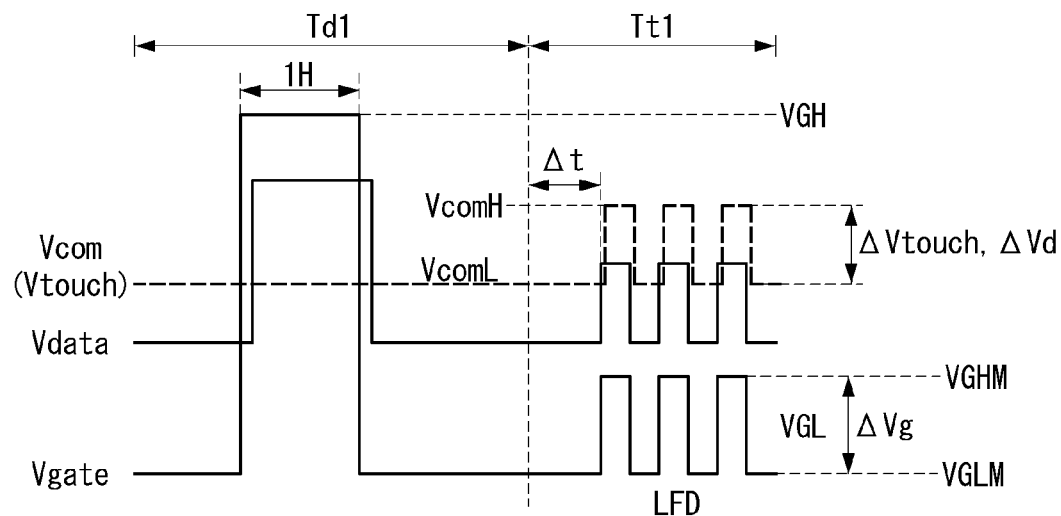

The data driver 102 supplies a no-load signal LFD which is in phase with the touch sensor driving signal to the data lines S1 to Sm in order to reduce an influence of parasitic capacitance of the touch sensors Cs during the touch sensing period. As illustrated in FIGS. 5 and 6, the no-load signal LFD is applied to the data lines S1 to Sm, the gate lines G1 to Gn, and the sensor lines L1 to Li. The no-load signal LFD applied to the sensor lines L1 to Li supplies electric charges to the touch sensors Cs and reduces parasitic capacitance between the neighboring sensor lines L1 to Li.

The data driver 102 is integrated in the SIC. The data driver 102 may be directly bonded onto a substrate of the display panel 100 by a chip on glass (COG) process. Each of the SRICs may be implemented as a single IC package including a SIC and an ROIC. In each of the SRICs, the ROIC may include a touch sensing unit 110.

A demultiplexer (not shown) may be disposed between the data driver 102 and the data lines S1 to Sm. The demultiplexer may be formed on the substrate of the display panel 100 or may be integrated in a drive IC together with the data driver 102. The demultiplexer distributes a data voltage input from the data driver 102 to the data lines S1 to Sm in a time division manner under the control of the timing controller 106. In the case of a 1:2 demultiplexer, the demultiplexer time-divides the data voltage input through one output channel of the data driver 102 and supplies the data voltage to two data lines in a time-division manner Therefore, the use of the 1:N (N is a positive integer of 2 or greater) demultiplexer may reduce the number of channels of the drive IC to 1/N.

The gate driver 104 includes a shift register that sequentially outputs gate pulses to the gate lines G1 to Gn of the display panel 100 under the control of the timing controller 106. The gate driver 104 sequentially supplies gate pulses (or scan pulses) synchronized with a data voltage to the gate lines G1 to Gm using the shift register during the display period to select a line of the display panel 100 into which the data voltage is written. During the touch sensing period, a shift clock of a gate on voltage is not input to the gate driver 104. As a result, the gate driver 104 does not output the gate pulse of the gate on voltage during the touch sensing period, but supplies the no-load signal LFD of a gate off voltage to the gate lines in order to minimize parasitic capacitance of the touch sensors Cs. The gate driver 104 may be implemented as a gate in panel (GIP) circuit formed together with the pixel array on the bottom substrate of the display panel 100 and may be bonded to a separate IC.

The timing controller 106 transmits digital video data (RGB) of the input image received from a host system (not shown) to the data driver 102. The timing controller 106 receives a timing signal such as a vertical synchronization signal Vsync, a horizontal synchronization signal Hsync, a data enable signal DE, and a main clock, which are received in synchronization with the pixel data of the input image and generates a data timing control signal for controlling an operation timing of the data driver 102 and a gate timing control signal for controlling an operation timing of the gate driver 104.

The gate timing control signal includes a gate start pulse VST, a gate shift clock GCLK, a gate output enable signal GOE, and the like. The gate timing control signal may be converted into a gate-on voltage VGH and a gate-off voltage VGL through a level shifter and supplied to the gate driver 104. The level shifter converts a low-level voltage of the gate timing control signal into a gate off voltage VGL and converts a high-level voltage of the gate timing control signal to a gate on voltage VGH.

The data timing control signal includes a source sampling clock (SSC), a polarity control signal (POL), a source output enable (SOE) signal, and the like. In the case of an organic light emitting display device, the polarity of the data voltage is not inverted, and thus, the polarity control signal (POL) for inverting the polarity of the data voltage is not required.

Data transmission lines in a multi-point form or a multi-drop form may be connected between the ICs of the data driver 102 and the timing controller 106. In this case, the timing controller 106 may transmit a differential signal in which a clock, the timing control signal, the data (RGB) of the input image, and the like, are encoded as a data packet defined in an EPI (clock embedded point-to-point interface) protocol, to the ICs of the data driver 102. The EPI protocol is described in detail in Korean Patent Laid-Open Publication No. 10-2010-0068936 (Jun. 24, 2010) and Korean Patent Laid-Open Publication No. 10-2010-0068938 (Jun. 24, 2010) which were filed by the applicant of the present disclosure.

The timing controller 106 may generate a touch synchronization signal Tsync defining a display period and a touch sensing period. The timing controller 106 transmits the touch synchronization signal Tsync to the touch sensing unit 110 to synchronize the display driving circuits with the touch sensing unit 110.

The host system may be realized as any one of a television system, a set-top box, a navigation system, a DVD player, a Blu-ray player, a personal computer (PC), a home theater system, and a phone system. The host system includes a system on chip (SoC) with a built-in scaler and converts the pixel data of the input image into a format suitable for display on the display panel 100. The host system transmits the timing signals Vsync, Hsync, DE, and MCLK, together with the digital video data of the input image, to the timing controller 106. In addition, the host system executes an application program associated with coordinate information of a touch input received from the touch sensing unit 110.

The touch sensing unit 110 drives the touch sensors Cs during the touch sensing period in response to the touch synchronization signal Tsync from the timing controller 106. The touch sensing unit 110 senses the touch input by supplying a touch sensor driving signal to the sensor lines L1 to Li during the touch sensing period. The touch sensing unit 110 determines the touch input by analyzing a charge variation of the touch sensor varied depending on the presence or absence of the touch input, and calculates coordinates of the touch input position. A touch report including the coordinate information of the touch input position is transmitted to the host system. The touch sensing unit 110 is connected to the MCU 120 as illustrated in FIG. 4.

FIG. 4 is a view illustrating a planar arrangement of in-cell touch sensors and a circuit configuration of the touch sensing unit 110.

Referring to FIG. 4, each of touch sensor electrodes C1 to C4 is connected to a plurality of pixels.

The touch sensing unit 110 may include a multiplexer 111 and a sensing circuit 112. The multiplexer 111 of the touch sensing unit 110 sequentially selects the sensor lines L1 to Li in predetermined order and connects the selected sensor lines to the sensing circuit 112 under the control of the MCU 120. Each of the multiplexers 111 sequentially connects the N sensor lines L1 to Li to the channel of the sensing circuit 112, thereby reducing the number of channels of the sensing circuit 112.

The sensing circuit 112 amplifies and integrates a charge amount of a sensor line signal received through the multiplexer 111 and converts the integrated amount into digital data, i.e., touch data. The sensing circuit 112 includes an amplifier amplifying the received touch sensor signal, an integrator accumulating an output voltage of the amplifier, and an analog-to-digital converter (ADC) converting a voltage of the integrator into digital data. The digital data output from the ADC is transferred, as touch data, to the MCU 120.

The MCU 120 controls the multiplexer 111 to connect the sensor lines L1 to Li to the sensing circuit 112. The MCU 120 determines the touch input by comparing the touch data received from the sensing circuit 112 with a predetermined threshold value. The MCU 120 executes a predetermined touch sensing algorithm to calculate coordinates of each touch input position to generate touch coordinate data XY and transmits a touch report including an identification code IC of each touch input, together with the touch coordinate data XY, to the host system.

FIGS. 5 and 6 are waveform views illustrating a method of driving pixels and in-cell touch sensors in a time-division manner.

Referring to FIGS. 5 and 6, one frame period may be time-divided into one or more display periods Td1 and Td2 and one or more touch sensing periods Tt1 and Tt2. When a display frame rate is 60 Hz, one frame period is approximately 16.7 ms. One touch sensing period Tt1 or Tt2 is allocated between the display periods Td1 and Td2.

The display driving circuits write current frame data into the pixels of the first block B1 during the first display period Td1 to update the image reproduced in the first block B1 to the current frame data. During the first display period Td1, the pixels of the other block B2 than the first block B1 maintains the previous frame data. The common voltage Vcom is supplied to the sensor lines L1 to Li during the first display period through a touch power generator (not shown).

The touch sensing unit 110 drives the touch sensors Cs in the screen during the first touch sensing period Tt1 under the control of the MCU 120 to convert the charge variation of the touch sensor before and after the touch into digital data. The touch data output from the touch sensing unit 110 is transmitted to the MCU 120.

The display driving circuits write the current frame data into the pixels of the second block B2 during the second display period Td2 to update the image reproduced in the second block B2 with the current frame data. During the second display period Td2, the pixels of the other block B1 than the second block B2 maintains the previous frame data. The common voltage Vcom is supplied to the sensor lines L1 to Li during the second display period.

The touch sensing unit 110 drives the touch sensors Cs during the second touch sensing period Tt2 under the control of the MCU 120 to output touch data to be transmitted to the MCU 120.

Since the touch sensors 110 are connected to the pixels, parasitic capacitance between the touch sensors Cs and the pixels is large. This parasitic capacitance causes a decrease in a signal-to-noise ratio (SNR) of the touch sensor signal.

During the display periods Td1 and Td2, pixel driving signals (Vcom, Vdata, and Vgate in FIG. 5) is supplied to the pixels. Vcom is a common voltage applied to the touch sensor electrodes C1, C2, C3, i.e., the common electrodes, through a sensor line 16 during the display periods Td1 and Td2. Vdata is a data voltage of the input image supplied to the data lines S1 to Sm during the display periods Td1 and Td2. Vgate is a voltage of the gate pulse supplied to the gate lines G1 to Gn during the display periods Td1 and Td2. The no load signal LFD is supplied to the data lines S1 to Sm, the gate lines G1 to Gn, and the sensor lines L1 to Li during the touch sensing periods Tt1 and Tt2. The no-load signal LFD supplies electric charges to the touch sensors Cs to drive the touch sensors Cs and minimizes the parasitic capacitance between the pixels and the touch sensors Cs.

The voltage Vtouch of the no-load signal LFD applied to the sensor line 16 is equal to the driving voltage of the touch sensor 20. In FIG. 6, $\Delta Vtouch = \Delta Vd = \Delta Vg$. $\Delta Vd$ is the voltage of the no-load signal LFD applied to the data lines S1 to Sm, and $\Delta Vg$ is the voltage of the no-load signal LFD applied to the gate lines G1 to Gn. Therefore, during the touch sensing periods Tt1 and Tt2, there is no voltage difference between both ends of parasitic capacitance in each of the parasitic capacitance between the data lines S1 to Sm and the sensor lines L1 to Li, the parasitic capacitance between the gate lines G1 to Gn and the sensor lines L1 to Li, and the parasitic capacitance between the sensor lines L1 to Li, thus reducing the electric charge amount charged in the parasitic capacitance.

A stabilization time $\Delta t$ until the waveform and the voltage of the no-load signal LFD are stabilized may be set when the display periods Td1 and Td2 are switched to the touch sensing periods Tt1 and Tt2. The stabilization time $\Delta t$ may be appropriately adjusted according to the parasitic capacitance of the display panel 100 and the touch sensor driving voltage Vtouch. After the stabilization time $\Delta t$, the touch sensors Cs are driven and a touch input is sensed.

Figure 7:
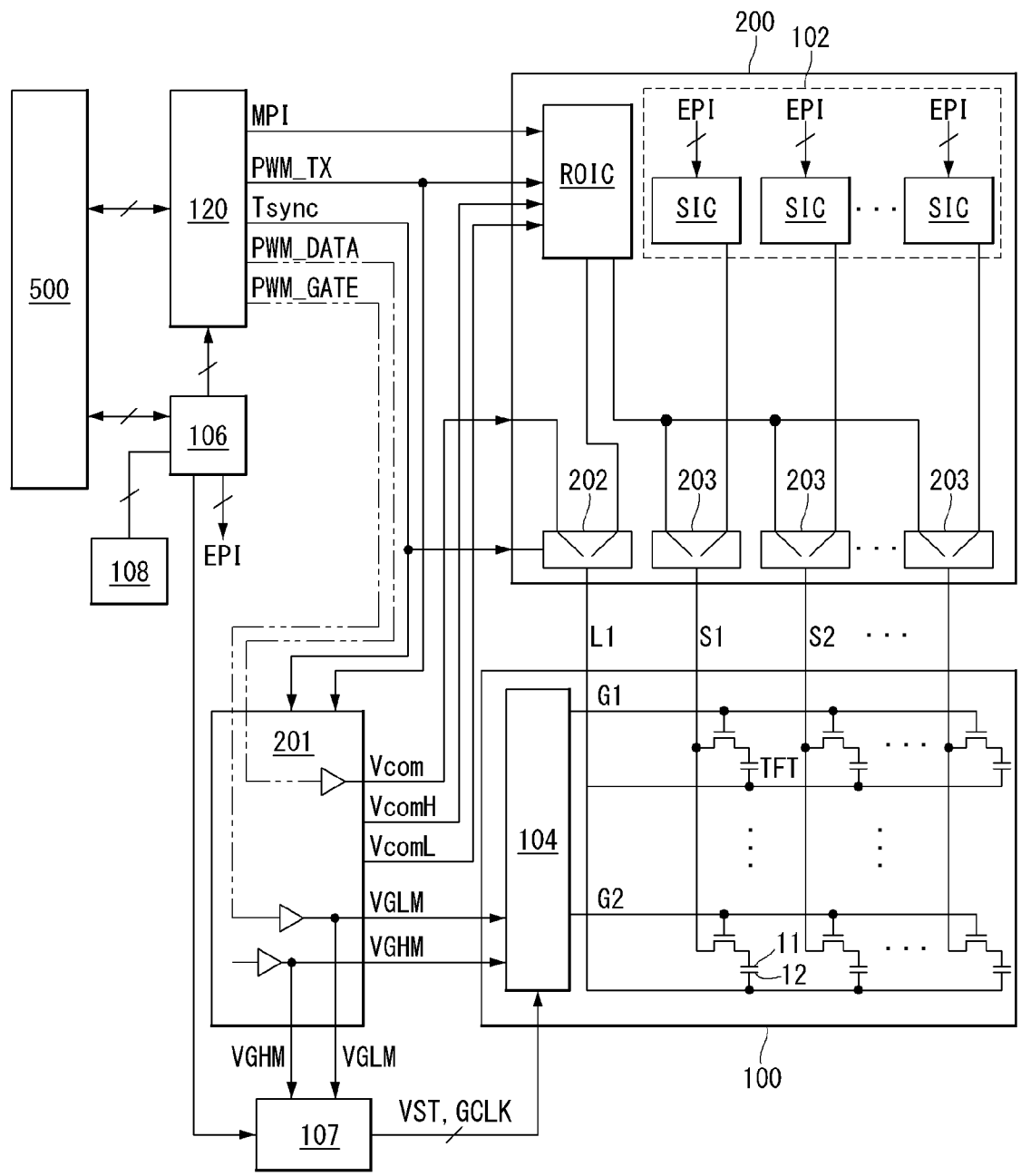
FIG. 7 is a view specifically illustrating the display device of FIG. 3 according to an embodiment of the present disclosure.

FIG. 7 is a view specifically illustrating the display device illustrated in FIG. 3. In FIG. 7, reference numeral 12 denotes a touch sensor electrode connected to the sensor line L1.

Referring to FIG. 7, an SRIC 200 is connected to the sensor lines L1 and the data lines S1 and S2. The SRIC 200 receives power from the touch power generator 201 to drive the sensor line L1 and receives pixel data from the timing controller 106 to drive the data lines S1 and S2.

The touch power generator 201 is synchronized with the SRIC 200 upon receiving the touch synchronization signal Tsync and pulse width modulated signals PWM_Tx, PWM_DATA, and PWM_GATE from the MCU 120. PWM_TX is a reference signal defining a duty ratio and a frequency of the no-load signal LFD. PWM_DATA defines a duty ratio and a frequency of the no-load signal LFD supplied to the data lines S1 and S2. PWM_GATE defines a duty ratio and a frequency of the no-load signal LFD supplied to the gate lines G1 and G2.

The touch power generator 201 receives external input power and outputs the common voltage Vcom and the powers VcomH, VcomL, VGHM, and VGLM necessary for driving the touch sensors Cs in accordance with the touch synchronization signal Tsync. VcomH and VcomL are a high-level voltage and a low-level voltage of the no load signal LFD applied to the sensor lines L1 and the data lines S1 and S2. VGH and VGL are respectively a high-level voltage and a low-level voltage of the no load signal LFD applied to the gate lines G1 and G2.

The SRIC 200 includes a touch sensing unit 110, a first multiplexer 202, a data driver 102, and a second multiplexer 203. The data voltage Vdata output from the DAC of the data driver 102 is supplied to the data lines S1 and S2 through the source output buffer.

The first multiplexer 202 supplies the common voltage Vcom to the sensor lines L1 during the display periods Td1 and Td2 and supplies the no load signal LFD from the touch sensing unit 110 to the sensor lines L1 during the touch sensing periods Tt1 and Tt2 under the control of the MCU 120. The second multiplexer 203 supplies the data voltage Vdata from the source output buffer of the data driver 102 to the data lines S1 and S2 during the display periods Td1 and Td2 and supplies the no-load signal LFD from the touch sensing unit 110 to the data lines L1 during the touch sensing periods Tt1 and Tt2 under the control of the MCU 120.

The host system 500 and the MCU 120 may communicate with each other in both directions through an I2C or SPI interface. The MCU 120 may transmit an interrupt indicating a defective event to the host system 500 to prevent a malfunction of the host system 500.

The timing controller 106 may be connected to an electrically erasable programmable read-only memory (EEPROM) 108. The EEPROM 108 stores waveform information and register set values necessary for controlling the display panel driving circuit such as a data timing control signal and a gate timing control signal. The timing controller 106 may read data stored in the EEPROM 108 through I2C communication. The level shifter 107 converts a voltage of the gate timing signal and transmits the converted voltage to the gate driver 104.

The host system 500 may transmit the pixel data of the input image, as a low voltage differential signaling (LVDS) signal to the timing controller 106. The host system 500 in both directions communicates with the timing controller 106 via the SPI. Display control related data is transmitted between the host system 500 and the timing controller 106 through the SPI.

Figure 8:
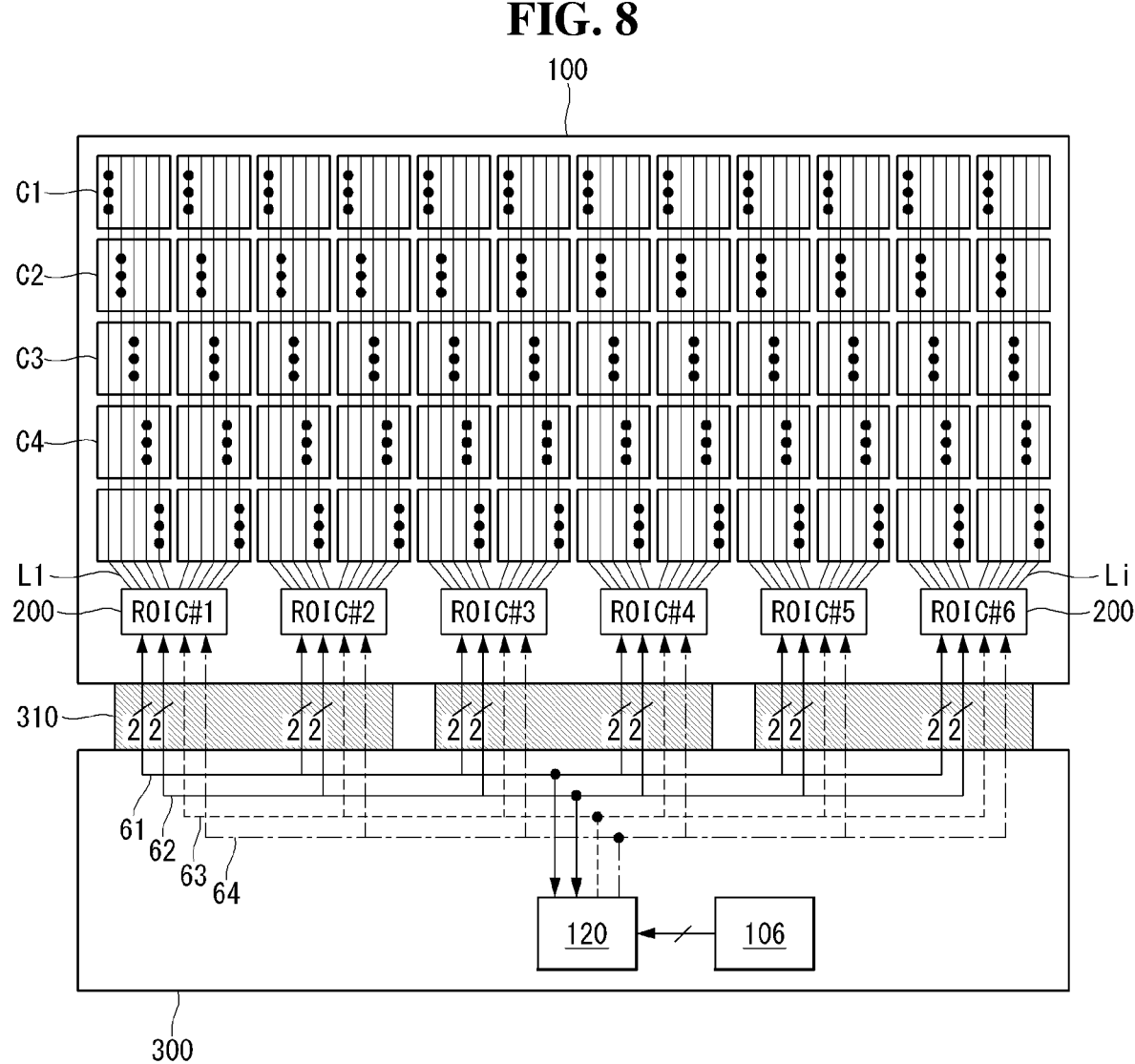
FIGS. 8 and 9 are views illustrating lines for two-way communication between an MCU and a plurality of SRICs according to an embodiment of the present disclosure.
Figure 9:
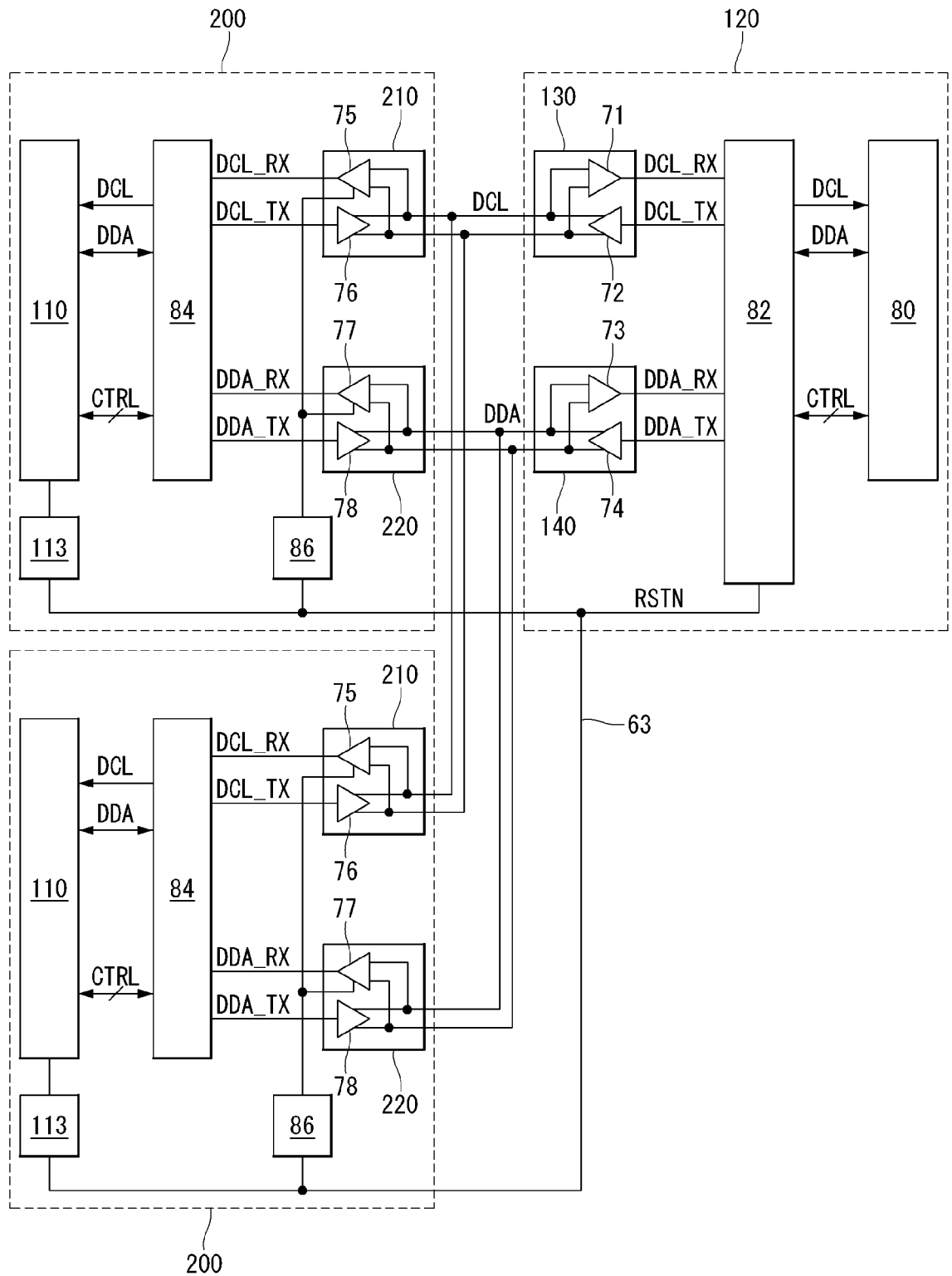

In FIG. 7, MPI denotes a two-way communication interface between the MCU 120 and the SRIC 200. In this two-way communication interface, one MCU 120 and a plurality of SRICs (or ROICs) are connected in a multi-point form sharing a pair of clock lines 61 (hereinafter, referred to as a "clock line pair") and a pair of data lines 62 (hereinafter referred to as a "data line pair") as illustrated in FIGS. 8 and 9. In FIG. 8, "ROIC #1 to ROIC #6" represents ROICs in the SRIC 200. The MCU 200 may be mounted on a printed circuit board (PCB) 300 together with the timing controller 106. The PCB 300 is connected to the display panel 100 through a flexible flat cable (FFC) 310. Lines on the PCB 300 are connected to the SRICs 200 through the FPC 310.

According to the present disclosure, the number of lines between the MCU 120 and the SRICs 200 and the number of pins of the MCU may be significantly reduced and an influence of EMI may be reduced through the multi-point connection. Clock and data are embedded in a differential signal including a positive polarity signal and a negative polarity signal and transmitted through the line pairs 61 and 62. Due to the common mode signal rejection effect of the differential signaling scheme, external noise is equally reflected in both of the line pairs, and thus, the influence of EMI may be reduced, as compared with a single termination signal.

A reset signal line 63 may be connected between the MCU 120 and the SRICs 200 in a multi-point manner Therefore, one reset signal line 63 may be shared by the MCU 120 and the SRICs 200.

The MCU 120 may reset the ROICs of the SRICs 200 or control ON/OFF of at least one of the RX buffers by simultaneously transmitting the reset signal RSTN to the SRICs 200 through the reset signal line 63. The reset signal RSTN may be generated as a TTL level signal.

A clock line 64 may be connected between the MCU 120 and the SRICs 200 in a multi-point manner. One clock line 64 may be shared by the MCU 120 and the SRICs 200. The MCU 120 supplies a clock ECLK required for driving the sensing unit 110 of the SRICs 200, i.e., the ROICs, to the SRICs 200 through one clock line 64. The clock ECLK may be transmitted as a TTL level clock signal to the SRICs 200. The sensing unit 110 may receive the separate clock ECLK, regardless of operation of the data driver 102, to sense a touch input even without an input image.

Referring to FIG. 9, the MCU 120 includes a first logical unit 80, a first interface controller 82, a first clock transmission/reception unit 130, and a first data transmission/reception unit 140.

The first logical unit 80 may analyze the touch data to determine a touch input position and generate control data CTRL for controlling the sensing unit 110. The control data CTRL includes a command for controlling the operation of the sensing unit 110, a data read/write command, a device address, a register address, and the like. The command may include a sensing timing, buffer gain adjustment, a feedback capacitor reset timing of an integrator, and the like. The PWM_TX may be generated according to control data defining the sensing timing. The device address has a code that identifies the ROIC of each of the SRICs 200. The MCU 120 transmits the device address to the SRICs 200 to select an SRIC to perform two-way communication. The MCU 120 may define a start address into or from which the touch data is written or read by transmitting a register address to the SRICs 200. Data DDA output from the first logical unit 80 includes control data CTRL. A clock DCL output from the first logical unit 80 is synchronized with the data DDA.

The first clock transmission/reception unit 130 includes a first RX clock buffer 71 and a first TX clock buffer 72. The first RX clock buffer 71 converts a differential signal pair clock received from the SRICs 200 through the clock line pair 61 into a single termination clock DCL_RX. The first TX clock buffer 72 converts the clock DCL_TX from the first interface controller 82 into a differential signal pair and supplies the positive polarity clock and the negative polarity clock to the SRICs 200 through the clock line pair 61.

The first data transmission/reception unit 140 includes a second RX data buffer 73 and a second TX data buffer 74. The second RX data buffer 73 converts the differential signal pair data received from the SRICs 200 through the data line pair 62 into single termination data DDA_RX. The second TX data buffer 74 converts the data DDA_TX from the first interface controller 82 into a differential signal pair including positive polarity data and negative polarity data and supplies the converted differential signal pair to the SRICs 200 through the data line pair 62.

The first interface controller 82 encodes the data DDA from the logical unit 80 according to a predetermined data transmission protocol and supplies the encoded data DDA to the first data transmission/reception unit 140. The first interface controller 82 supplies the control data CTRL obtained from the data DDA_RX received from the SRICs 200 via the first data transmission/reception unit 140 to the logical unit 80. The control data CTRL generated from the SRICs 200 may include a data read/write command. The data read/write command defines a reception mode RX and a transmission mode TX of each of the ROICs and the MCU. For example, in the data read command, the ROIC operates in the transmission mode TX and the MCU operates in the reception mode RX. In the data write command, the MCU operates in the transmission mode TX and the ROIC operates in the reception mode RX. The first interface controller 82 supplies the clock DCL from the logical unit 80 to the first clock transmission/reception unit 130.

Each of the SRICs 200 includes a sensing unit 110, a second interface controller 84, a second clock transmission/reception unit 210, and a second data transmission/reception unit 220. In FIG. 9, the data driver 102 in the SRIC is omitted.

The second clock transmission/reception unit 210 includes a third RX clock buffer 75 and a third TX clock buffer 76. The third RX clock buffer 75 converts the differential signal pair clock received from the MCU 120 through the clock line pair 61 into a single termination clock DCL_RX. The third TX clock buffer 76 converts the clock DCL_TX from the second interface controller 84 into a differential signal pair and transmits a positive polarity clock and a negative polarity clock to the MCU 120 via the clock line pair 61.

The second data transmission/reception unit 220 includes a fourth RX data buffer 77 and a fourth TX data buffer 78. The fourth RX data buffer 77 converts the differential signal pair data received from the MCU 120 via the data line pair 62 into single termination data DDA_RX. The fourth TX data buffer 78 converts the data DDA_TX from the second interface controller 84 into a differential signal pair including positive polarity data and negative polarity data and supplies the converted differential signal pair to the MCU 120 through the data line pair 62.

The second interface controller 84 encodes the data DDA from the sensing unit 110 according to a predetermined data transmission protocol and supplies the encoded data to the second data transmission/reception unit 220. The second interface controller 84 supplies the control data CTRL obtained from the data DDA_RX received from the MCU 120 through the second data transmission and reception unit 220 to the sensing unit 110. The second interface controller 84 supplies the clock DCL from the sensing unit 110 to the second clock transmission/reception unit 210.

Each of the SRICs 200 further includes a receiver controller 86 for blocking introduction of reflected waves propagated to the ROICs. The receiver controller 86 may control ON/OFF of at least one of the RX buffers 75 and 77 in response to at least one of a reset signal RSTN, a lock signal LOCK2, and a slave selection signal SSN. In the following description, the receiver controller 86 will be described based on an example in which ON/OFF of the RX clock buffer 75 is controlled by either the reset signal RSTN or the lock signal LOCK2 in the first embodiment, but the RX data buffer 77 may also be controlled together with the RX clock buffer 75.

When the reset signal RSTN has a first logical value, the sensing unit 110 and the RX buffers 75 and 77 maintain the current operation mode. When the reset signal RSTN is generated as having a second logical value for a time period smaller than a predetermined reference time, the receiver controller 86 applies power to the RX clock buffer 75 to wake up the RX clock buffer 75 to switch it to an active mode. Here, the RX clock buffer 75 is turned on and normally driven. When the reset signal RSTN is inverted from the second logical to the first logic, the receiver controller 86 turns off power of the RX clock buffer 75 to switch the RX clock buffer 75 to an OFF state. When the reset signal RSTN is generated as having a second logical value for a time period greater than the reference time period, an ROIC resetting unit 113 temporarily stops power supply to the sensing unit 110, and resets the elements configuring the sensing unit 110 through a resupply process. In another embodiment, when the lock signal LOCK2 applied to the timing controller 106 is toggled, the receiver controller 86 may switch the RX clock buffer 75 to the ON state as illustrated in FIG. 22.

Figure 11:
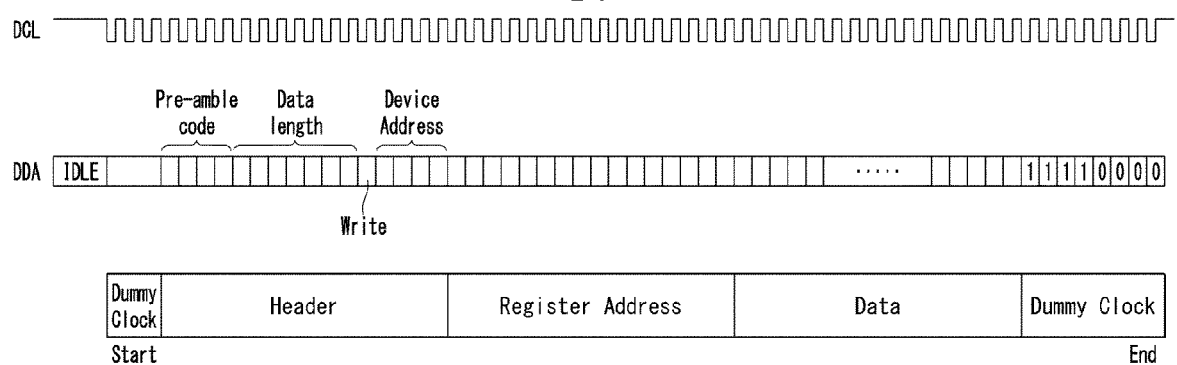

FIGS. 10 and 11 illustrate data packet configurations defined in a two-way communication protocol between a MCU and a plurality of SRICs.

Referring to FIGS. 10 and 11, a data packet transmitted through the data line pair 62 includes a header interval, a register address period, and a data period allocated between a start dummy clock and an end dummy clock.

Each of the start dummy clock and the end dummy clock includes predetermined clock bits. The receiver controller 86 of a slave device operating in the reception mode RX may monitor received data and wake up the RX data buffers 73 and 77 when the start dummy clock is received. The RX data buffers 73 and 77 may be awakened by the receiver controller 86 to operate in the active mode to normally receive a data packet, and when the end dummy clock is received, the receiver controller 86 may be switched to an idle mode and turned off. When the RX data buffers 73 and 77 are in the idle mode, power supply to the RX data buffers 73 and 77 is cut off and there is no current consumption in the RX data buffers 73 and 77.

The header interval may include a total of 16-bit header code including 4 bits of preamble code, 7 bits of data length, 1 bit of read/write, and 4 bits of device address. The preamble code defines an operation mode of the MCU 120 and the SRICs 200 according to a coding value thereof. A command indicating the transmission mode TX and the reception mode RX of the ROIC of each of the SRICs 200 and the MCU 120 may be included by the preamble code. For example, when the preamble code is "1111", it is an MCU command code of individually selecting the ROICs of the SRICs 200, and when the preamble code is "1110", it may be an MCU command for simultaneously selecting the ROICs of all the SRICs 200. When the preamble code is 1111 or 1110, the MCU 120 is in the transmission mode TX and the ROICs of the SRICs 200 are in the reception mode RX. When the preamble code is 1111, an ROIC that communicates with the MCU 120 is individually selected by a device address. Meanwhile, when the preamble code is 1110, all the ROICs are simultaneously selected and are switched to the reception mode RX at the same time, and thus, the device address is processed as 'don't' care'.

When the preamble code is "1101", it may be an SRIC data read command code to read touch data stored in a buffer memory of the SRICs 200. When the preamble code is "1100", it may be a read request code to read data stored in the buffer memory of the SRICs 200. When the preamble code is 1101 or 1100, the MCU 120 is in the reception mode TX and the ROICs of the SRICs 200 are in the transmission mode TX. The preamble code defines an ROIC selection method of the SRICs 200 in which a communication link with the MCU 120 is formed, and an operation mode of the MCU 120 and the ROICs.

The data length 7 bits defines a data length to be transmitted in the data interval. The number of data received in the data interval after a register address is determined by the number of data defined by the data length 7 bits. The data length may define a maximum of 127 data. The device address indicates the ROIC of the SRIC 200. The register address defines a start address of a memory from or into which data to be transferred is read or written during the data interval. In other words, the data received after the register address is written or read from the address of the memory defined in the register address. Here, the memory may be a buffer memory built in the MCU 120 or the SRIC 200.

When the end dummy clock is received in the SRICs 200, the SRICs 200 recognize that one data packet has been completely received and turn off power of the RX buffer of the ROIC to switch the RX buffers 75 and 77 to an OFF state.

Figure 12:
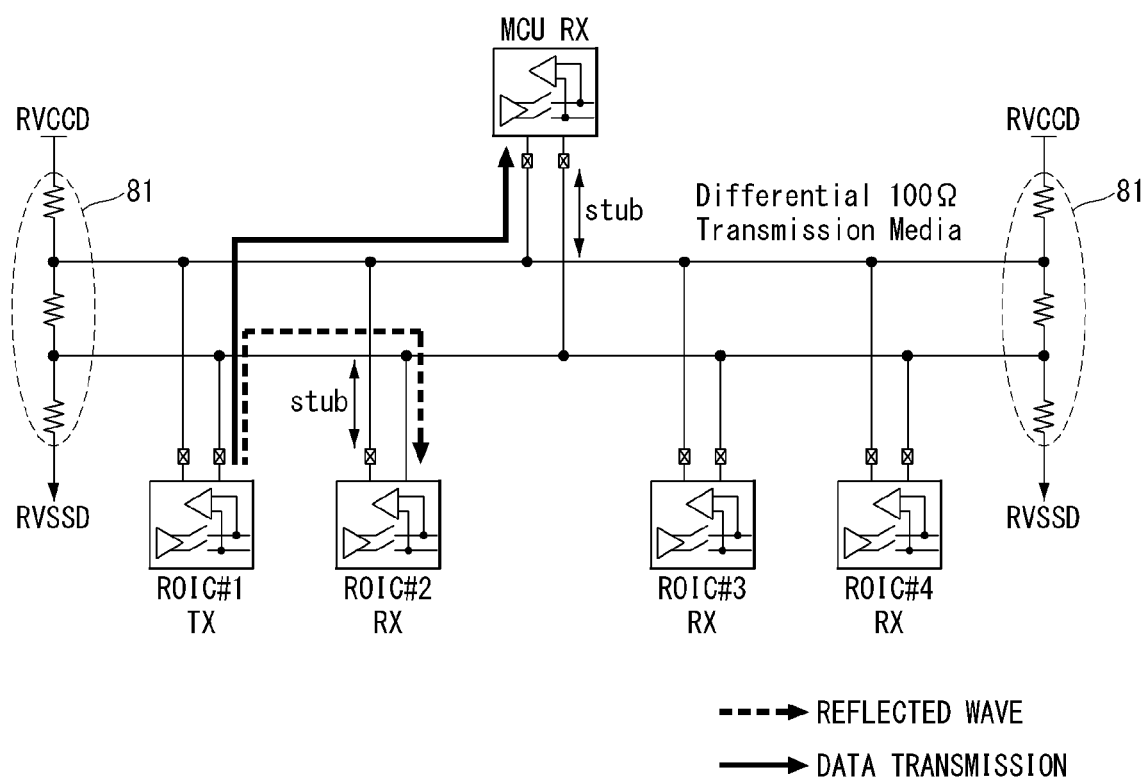
FIG. 12 is a view illustrating reflected waves on a two-way communication line between an MCU and SRICs according to an embodiment of the present disclosure.

The line pairs 61 and 62 for the interface between the MCU 120 and the SRICs 200 are connected in a multi-point manner. At both ends of these line pairs 61 and 62, a termination resistor 81 connected between RVCCD and RVSSE is required as illustrated in FIG. 12. The high-potential voltage RVCCD and the low-potential voltage RVSSD are applied to the termination resistor 81. When a stub between the termination resistor 81 and the transmitter TX and the receiver RX becomes long, signal distortion occurs due to reflected waves. Therefore, impedance matching between these elements is important.

Reliability of touch sensing performance may be obtained only when signal integrity of the data transmitted between the MCU 120 and the SRICs 200 is assured. Signal integrity is a measure of quality of an electrical signal, which refers to maintaining a signal pattern measured in the receiver RX as the original digital data without distortion due to noise when the digital data signal generated in the transmitter TX is transmitted through a line. Here, the line may include an integrated circuit, a packaging, or a PCB existing in the line pair 61 and 62, and the like. Signal integrity deviation may be expressed by amplitude and time. A typical example of this analytical substrate is an eye diagram measurement method.

FIG. 14 is a view illustrating a two-way communication method between the MCU 120 and the SRICs 200. In FIG. 14, "Active" refers to a reception mode in which the RX buffers are normally driven, and "IDLE" refers to an idle mode in which the RX buffers are not driven.

Referring to FIG. 14, when the MCU 120 is in the transmission mode TX, the ROICs of the SRICs 200 operate in the reception mode to receive data from the MCU 120. The ROICs of the SRICs 200 may sequentially operate in the TX mode in predetermined order and transmit touch data to the MCU 120.

Figure 13:
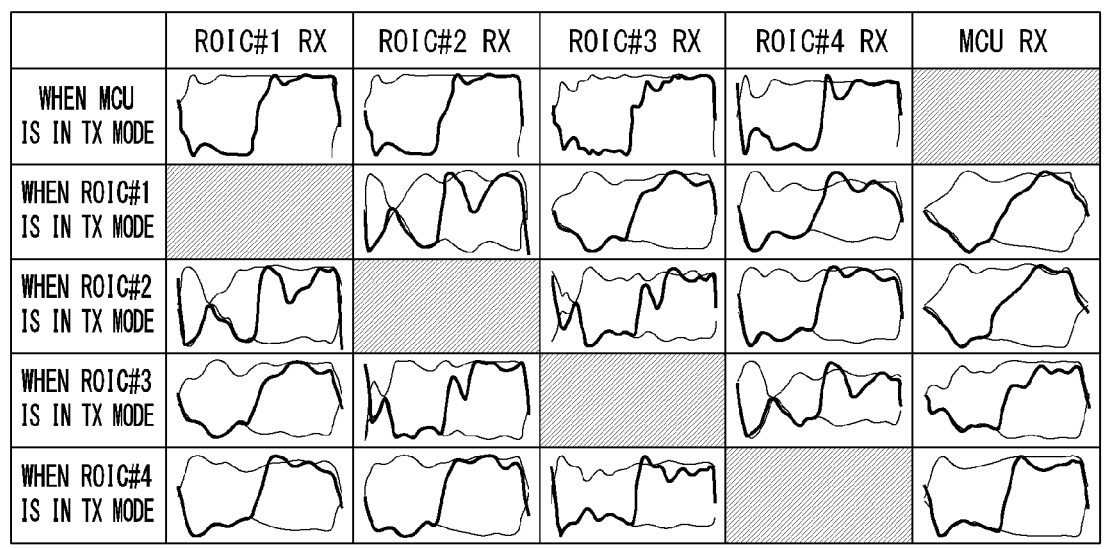
FIG. 13 is a view illustrating an eye diagram of a signal measured at a receiver of SRICs when one of the SRICs is in a transmission mode.

If the RX clock buffers of the SRICs 200 are always driven, when one of the SRICs 200 operates in the transmission mode, the RX clock buffers of the other SRICs 200 adjacent thereto operate, and thus, power consumption is increased and reflected waves propagate to ROICs of adjacent SRICs through the RX clock buffers 75. Here, if impedance matching is not optimized, adjacent SRICs are significantly affected by reflected waves and an eye diagram measured at the receiver of the ROICs of the SRICs is reduced in voltage difference, making it impossible to read a signal. In the case of a normal signal transmission state, the eye diagram should be 200 mV or higher. However, as can be seen from the eye diagram indicated by the pink range in FIG. 14, the eye diagram is measured as an abnormal waveform in the ROIC to which the reflected waves are applied, and the voltage is reduced to be lower than 200 mV. In this case, the ROIC to which the reflected waves are applied cannot recognize whether received data is data from another ROIC or whether it is from the MCU, and thus, it may malfunction. In FIG. 13, the unbolded line is a clock (DCL) measurement value and the bold line is a data (DDA) measurement value. The shaded eye diagram is the clock (DCL) and data (DDA) measured when the MCU and ROIC normally communicate with each other in both directions.

The present disclosure maintains the RX clock buffer 75 of the ROIC in an OFF state and switches the OFF state to ON state using a wake-up or attention signal only when necessary. As the wake-up signal, the reset signal RSTN may be utilized, or a signal separated from the reset signal RSTN may be used.

Figure 15:
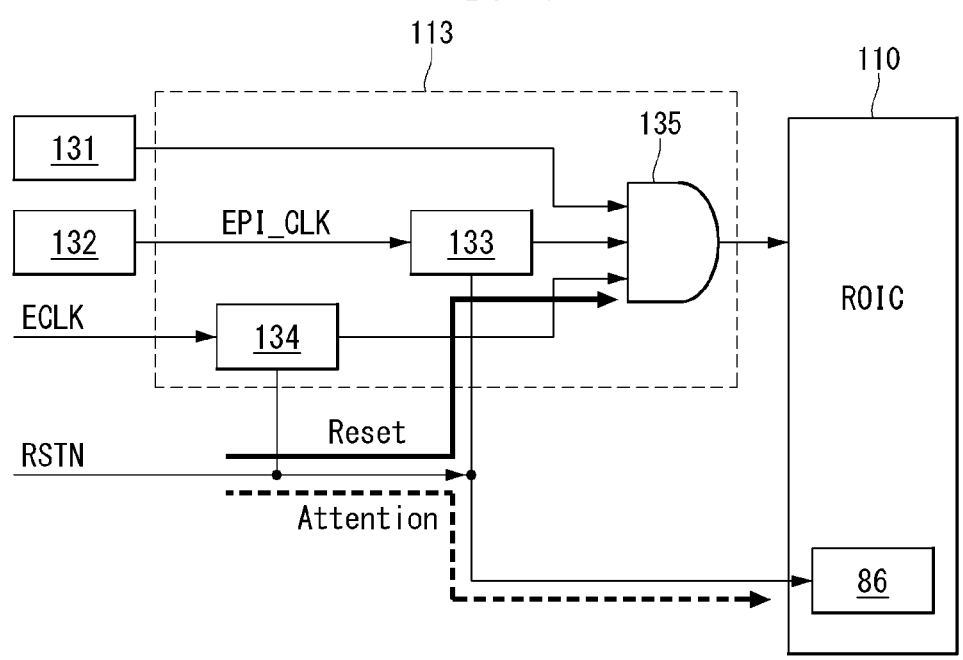
FIG. 15 is a circuit diagram illustrating ROIC resetting using a reset signal and wake-up of an RX buffer according to an embodiment of the present disclosure.

FIG. 15 is a circuit diagram illustrating ROIC resetting using a reset signal and wake-up of an RX clock buffer. The circuit illustrated in FIG. 15 may be embedded in each of the SRICs.

Referring to FIG. 15, the reset signal RSTN output from the MCU 120 is branched through the reset signal line 63 and transferred to the SRICs 200. In each of the SRICs 200, the reset signal RSTN is supplied to the ROIC resetting unit 113 and the receiver controller 86.

The ROIC resetting unit 113 includes a first counter 133, a second counter 134, and an AND gate 135. The ROIC resetting unit 113 resets all the components of the sensing unit 110 when driving power of the SRIC 200 is cut off or when the reset signal RSTN is generated as a second logical value for a predetermined reference time or greater. The first logical value of the reset signal RSTN may be a high level (high=1) and the second logical value may be a low level (low=0).

A power sensing unit 131 monitors a voltage level of power and outputs an output signal having the first logical value when the voltage is equal to or higher than a predetermined reference voltage, and is generates an output signal having the second logical value when the power is discharged as having a voltage lower than the predetermined reference. Therefore, the power sensing unit 131 senses driving power ON/OFF of the SRICs 200.

A clock restoring unit 132 generates an internal clock EPI_CLK for sampling the data of the input image by restoring a clock installed in the data received by the data driver 102 through an EPI interface using a clock data recovery (CDR) circuit.

A first counter 133 starts to count a second logical interval (low interval) of the reset signal RSTN when the reset signal RSTN is inverted to the second logical value by the internal clock EPI_CLK input from the clock restoring unit 132. The first counter 133 outputs the second logical value when the second logical interval of the reset signal RSTN reaches the predetermined reference time, and outputs the first logical value in other cases.

A second counter 134 starts to count the second logical interval of the reset signal RSTN when the reset signal RSTN is inverted to the second logical value by the clock ECLK received from the MCU 120. The second counter 134 outputs the second logical value when the second logical interval of the reset signal RSTN reaches the predetermined reference time, and outputs the first logical value in other cases.

An AND gate 113 outputs the first logical value when all of the output signal of the power sensing unit 131, the output signal of the first counter 133, and the output of the second counter 134 have a high logical level. When the output signal of the AND gate 113 has the first logical value, the sensing unit 110 maintains the current operation mode. Meanwhile, if any one of the output signal of the power sensing unit 131, the output signal of the first counter 133, and the output signal of the second counter 134 has the second logical value, and gate 113 generates an output signal having the second logical value. The sensing unit 110 is reset and initialized when the output signal of the AND gate 113 has the second logical value. Therefore, the ROIC resetting unit 113 initializes the sensing unit 110 when power is cut off or when the second logical interval of the reset signal RSTN counted by using the clock CLK received from the MCU 120 or the internal clock EPI_CLK of the data driver 102 is the predetermined reference time or greater. The reference time may be set to 500 μs but is not limited thereto because it is only an example.

When the logical value of the reset signal RSTN is inverted to the second logical value, the receiver controller 86 supplies power to the RX clock buffer 75 to drive the RX buffers 75 and 77 in the active mode. When the second logical interval of the reset signal RSTN is less than the reference time, the receiver controller 86 maintains the ON state of the RX clock buffer 75, and thereafter, when the reset signal RSTN is inverted to the first logical value, the receiver controller 86 cuts off power of the clock buffer 75 to switch the RX clock buffer 75 to an OFF state.

Figure 16:
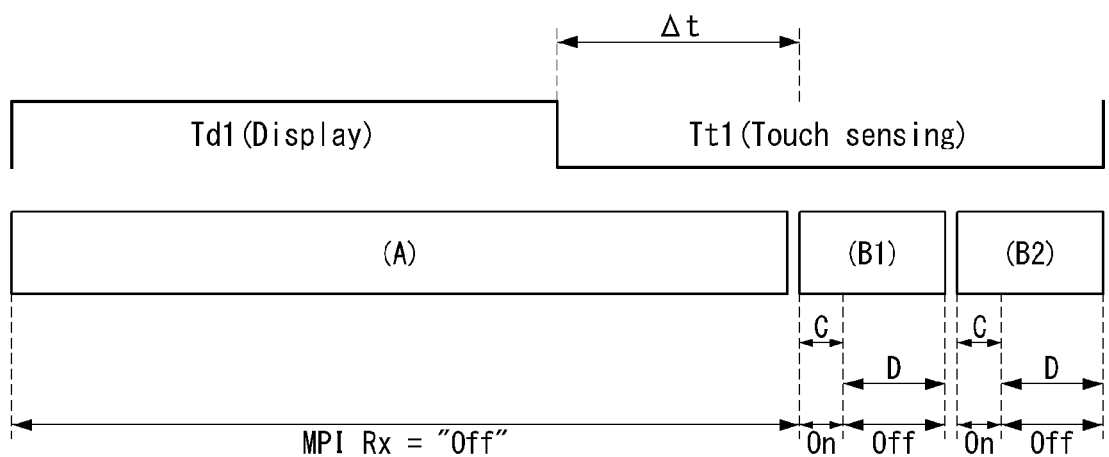
FIG. 16 is a view illustrating ON/OFF intervals of RX buffers of an ROIC according to an embodiment of the present disclosure.

FIG. 16 is a view illustrating ON/OFF intervals of the RX clock buffer 75 of the ROIC. In FIG. 16, interval (A) is a data transmission standby interval including the display period Td1 and the stabilization time Δt. The RX clock buffer 75 of the SRICs 200 remains in the OFF state during the interval (A). Intervals (B1) and (B2) include a period during which touch data is transmitted. Each interval B1 and B2 is divided into an activation interval C of the RX clock buffer 75 and a deactivation interval D during which the RX clock buffer 75 is turned off. The ROIC of the first SRIC 200 may operate in the transmission mode TX to transmit touch data to the MCU 120 during the interval (B1). The ROIC of the second SRIC 200 may operate in the transmission mode TX to transmit touch data to the MCU 120 during the interval (B2). During the activation interval (C) of the RX clock buffer 75, the RX clock buffer 75 is turned on by power applied thereto. Here, the RX clock buffer 75 is normally driven in the active mode. During the deactivation period D of the RX clock buffer 75, the RX clock buffer 75 is powered off and the RX clock buffer 75 is an in OFF state. During the deactivation period (D), the RX clock buffer 75 is not driven and therefore there is no current consumption of the RX clock buffer 75.

Figure 17:
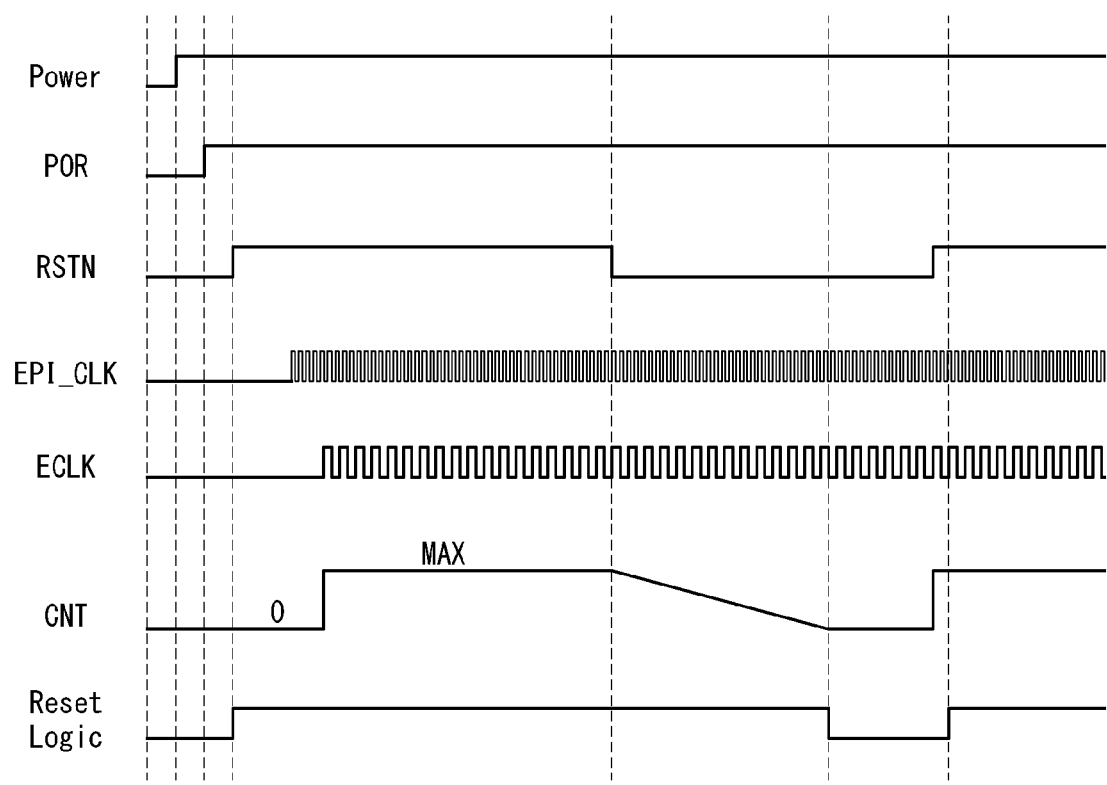
FIG. 17 is a waveform view illustrating input/output waveforms of the circuit illustrated in FIG. 15 according to an embodiment of the present disclosure.

FIG. 17 is a waveform view illustrating input/output waveforms of the circuit illustrated in FIG. 15. In FIG. 17, POR is an output signal of the power sensing unit 131, and CNT is an output signal of the first and second counters 133 and 134. Reset Logic is an output signal of the AND gate 135.

Figure 18:
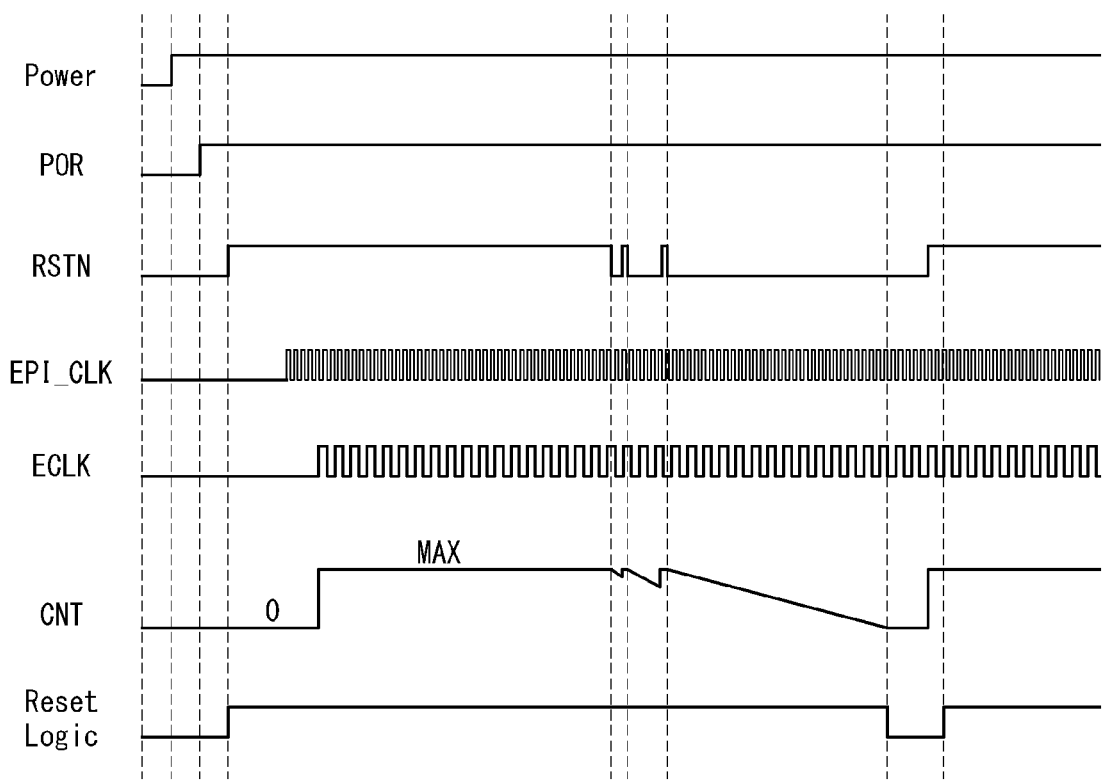
FIG. 18 is a waveform view illustrating counter resetting when a second logical interval of a reset signal is generated for a time greater than a predetermined reference time according to an embodiment of the present disclosure.

FIG. 18 is a waveform view illustrating counter resetting when the second logical interval of the reset signal occurs for a time greater than the predetermined reference time. As illustrated in FIG. 18, when a pulse is input in the second logical interval of the reset signal RSTN, the counters 133 and 134 are reset and start counting again. Therefore, a malfunction in the first logical interval of the reset signal RSTN may be prevented and wake-up of the RX clock buffer 75 and the resetting operation of the sensing unit 110 may be distinguished from each other.

Figure 19:
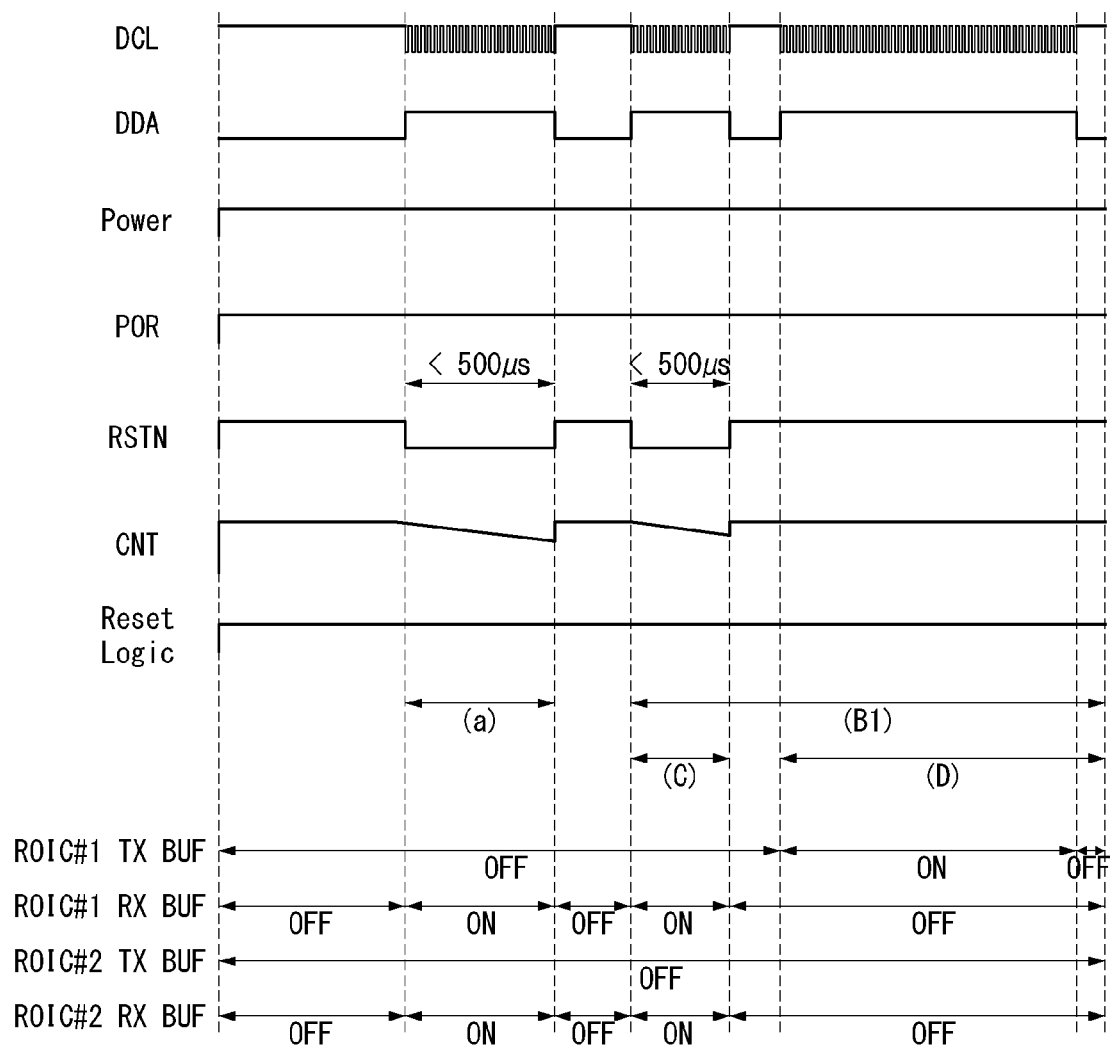
FIG. 19 is a waveform view illustrating ON/OFF intervals of RX clock buffers according to an embodiment of the present disclosure.

FIG. 19 is a waveform view illustrating ON/OFF intervals of RX clock buffers.

Referring to FIG. 19, when the reset signal RSTN is inverted to the second logical value, the RX clock buffer 75 may be powered on and switched to the active mode. Here, the ROIC selected by the MCU 120 may operate in the reception mode RX by receiving a read request code (Read Request) from the MCU 120. When the first logical interval of the reset signal RSTN is smaller than 500 μs, the ROIC is not reset and the RX clock buffer 75 is switched to an ONs state.

The reset signal RSTN includes a first logical interval (a) and a second logical interval (C). The first logical interval (a) may exist within the stabilization time Δtd of the interval (A) in FIG. 16. The first logical interval (a) may be an interval of a power-on state in which power is supplied to the MCU 120 or an interval during which a register of the ROIC is to be set. The second logical interval (C) may be an interval for designating a device address and a data length of an ROIC for the MCU 120 to read touch data when the corresponding ROIC transmits a command code indicating that transmission of touch data is ready to the MCU 120, after finishing sensing of a touch input. Each of the first and second logical intervals (a) and (C) is generated as 500 μs. Accordingly, after the RX clock buffers 75 of the ROICs are turned on to be normally driven during the first and second logical intervals (a) and (C), the RX clock buffers 75 are turned off again when the reset signal RSTN is inverted to high logic.

The first ROIC (ROIC #1) operates in the transmission mode TX according to a read data request of the MCU 120 during a period (d) and transmits the touch data stored in the buffer memory to the MCU 120. Here, the other ROICs (ROIC #2) are not affected by reflected waves because the RX clock buffer 75 remains in the OFF state. As can be seen from FIG. 19, since the RX clock buffer is driven only in part of the touch sensing periods Tt1 and Tt2, rather than during the entire touch sensing period, current consumption of the ROIC may be minimized, and reflected waves of the other ROICs may be minimized when the touch data is transmitted from the ROIC.

Figure 20:
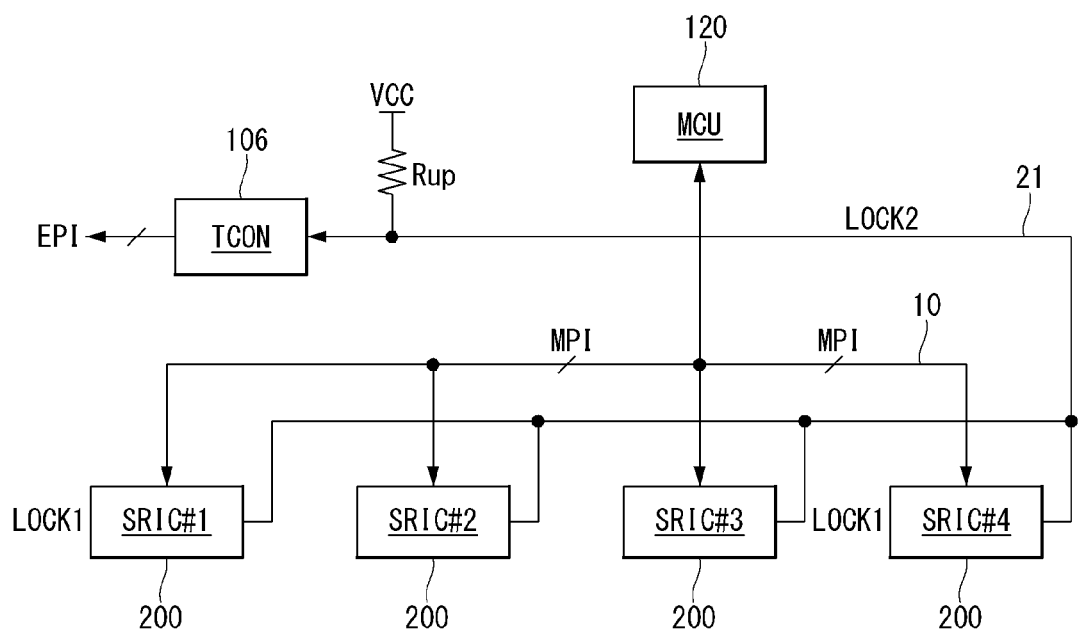
FIG. 20 is a view illustrating an example of a lock check line connected between a timing controller and the SRICs according to an embodiment of the present disclosure.
Figure 21A:
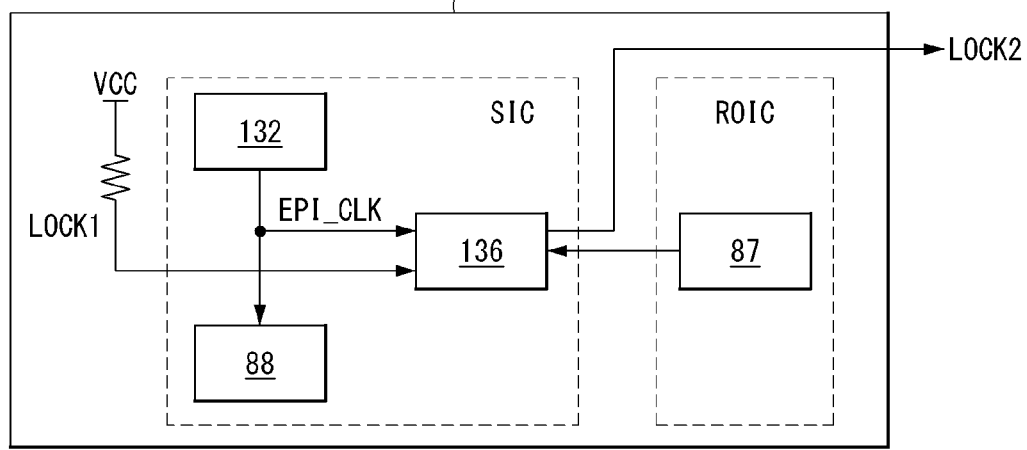
FIGS. 21A and 21B are views illustrating an example of an SRIC that wakes up an RX clock buffer using a lock signal according to an embodiment of the present disclosure.
Figure 21B:
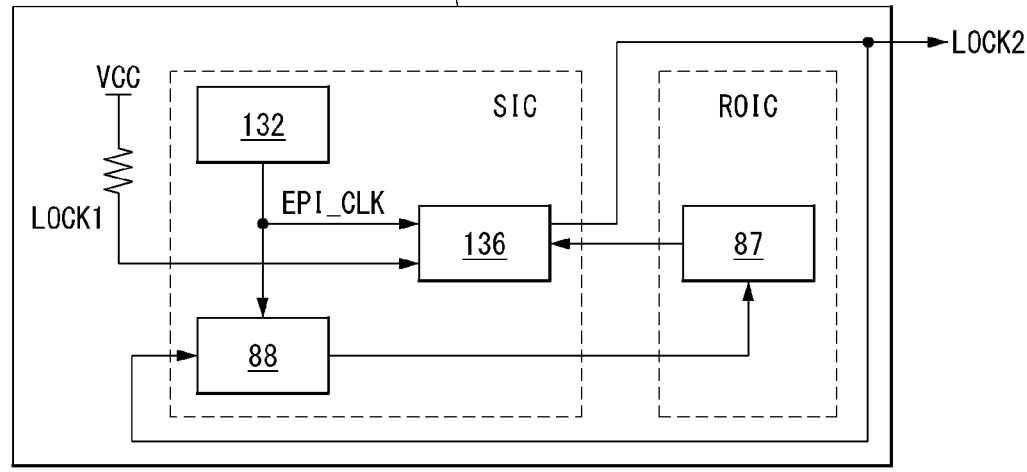

FIG. 20 is a view illustrating an example of a lock check line 21 connected between the timing controller 106 and the SRICs 200. In FIG. 20, reference letter "Rup" is a pull-up resistor connected between the VCC and the line 21. FIGS. 21A and 21B are views illustrating an example of an SRIC that wakes up the RX clock buffer using a lock signal. FIG. 22 is a waveform view illustrating an example of controlling ON/OFF of the RX clock buffer using the lock signal.

Referring to FIGS. 20 to 21, according to the EPI interface protocol, if a phase of the internal clock restored by the CDRs of all the SICs is not locked, the timing controller 106 transmits a preamble signal until the phase of the internal clock is locked, and when the phase of the internal clock is locked, the timing controller 106 does not transmit control data and pixel data. To this end, a lock check line 21 connects the timing controller 106 and the SRICs 100 in a multi-point or multi-drop form. Thus, the SRICs 100 are connected to the timing controller 106 by sharing one lock check line 21.

In FIG. 20, LOCK1 is a first lock signal which is locked to a high logic of a VCC potential. LOCK2 is a second lock signal transmitted to both the timing controller 106 and the SRICs 200 through the lock check line 21.

Each of the SRICs 200 further includes a first wake-up controller 87, a second wake-up controller 88, and a lock checking unit 136, as illustrated in FIGS. 21A and 21B.

The receiver controller 86 of the first SRIC (SRIC #1) maintains the RX clock buffer 75 in the ON state during the display periods Td1 and Td2 and the touch sensing periods Tt1 and Tt2. In the first SRIC (SRIC #1), the first RX wake-up controller 87 applies a wake-up signal to the lock checking unit 136 when it is necessary to drive the RX clock buffer 75 (C) under the control of the MCU 120.

In the case of SRICs #2 to #6 excluding the first SRIC (SRIC #1), the second wake-up controller 88 counts a second logical interval of a lock signal LOCK2, and if the second logical interval is less than the reference time, the second wake-up controller 88 transmits an interrupt signal to the first wake-up controller 87. In response to the interrupt signal from the second wake-up controller, the first wake-up controller 87 transmits a wake-up signal to the lock checking unit 136. The lock checking unit 136 inverts the lock signal LOCK2 accordingly.

The lock checking unit 136 generates the lock signal LOCK2 as the first logical value when the phase of the clock EPI_CLK restored by the clock restoring unit 32 is locked. Meanwhile, the lock checking unit 136 inverts the lock signal LOCK2 to the second logical value when the phase of the clock EPI_CLK is not locked. When the wake-up signal from the first wake-up controller 87 is received as indicated by the dotted circle in FIG. 22, the lock checking unit 136 counts the clock EPI_CLK and toggles the lock signal LOCK for a short time less than the predetermined reference time. In response to the second logical value of the short lock signal LOCK2, the receiver controller 86 of the SRICs #2 to #6 other than the first SRIC (SRIC #1) applies power to the RX clock buffer 75 to normally drive the RX clock buffer 75. Here, the RX clock buffer 75 is inverted from the idle mode to the active mode.

Figure 23:
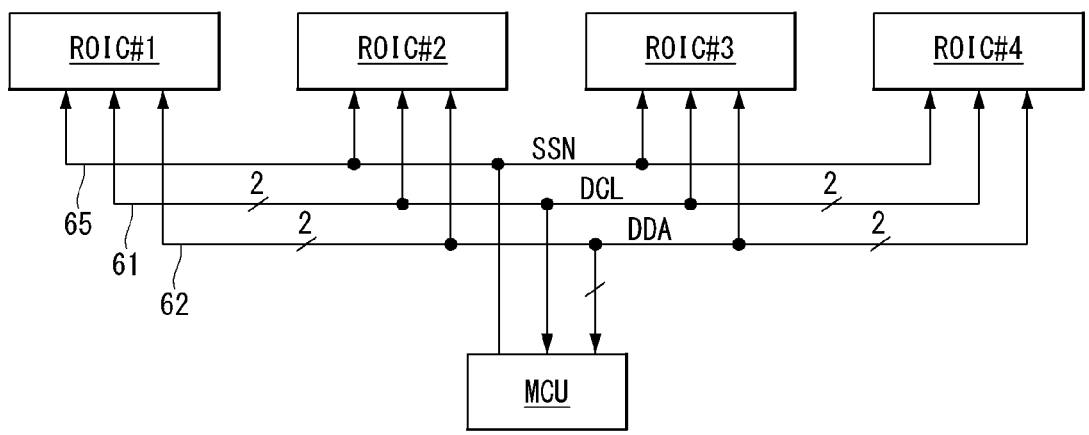
FIG. 23 is a view illustrating a signal transmission device according to another embodiment of the present disclosure.
Figure 24:
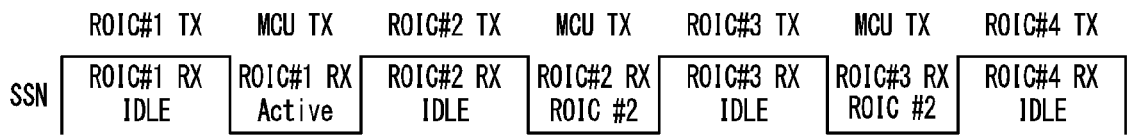
FIG. 24 is a view illustrating transmission/reception states of MCU and ROICs according to a slave selection (SSN) signal according to an embodiment of the present disclosure.
Figure 25:
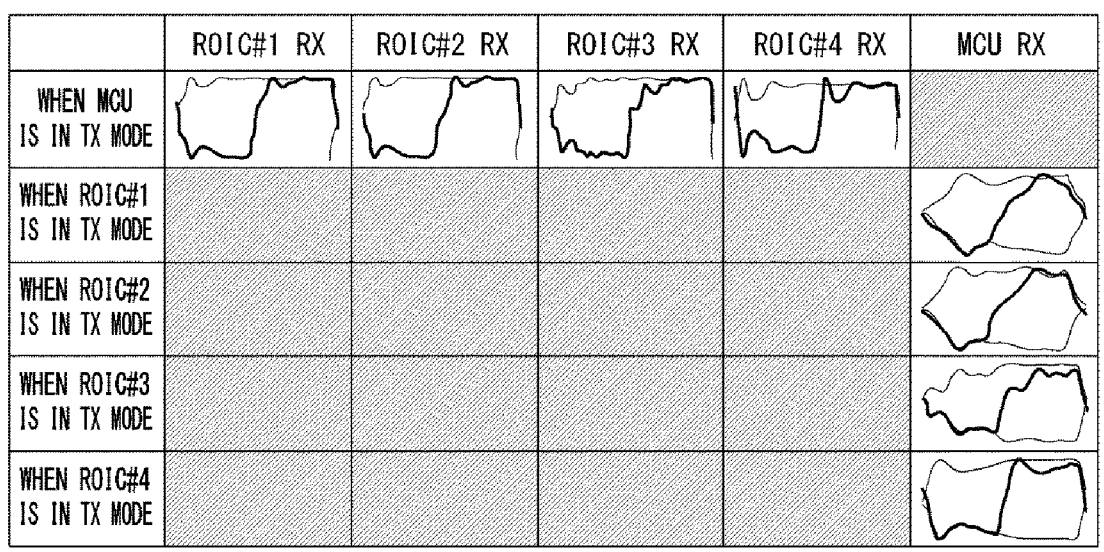
FIG. 25 is a view illustrating states of RX buffers of ROICs an MCU according to an SSN signal according to an embodiment of the present disclosure.
Figure 26:
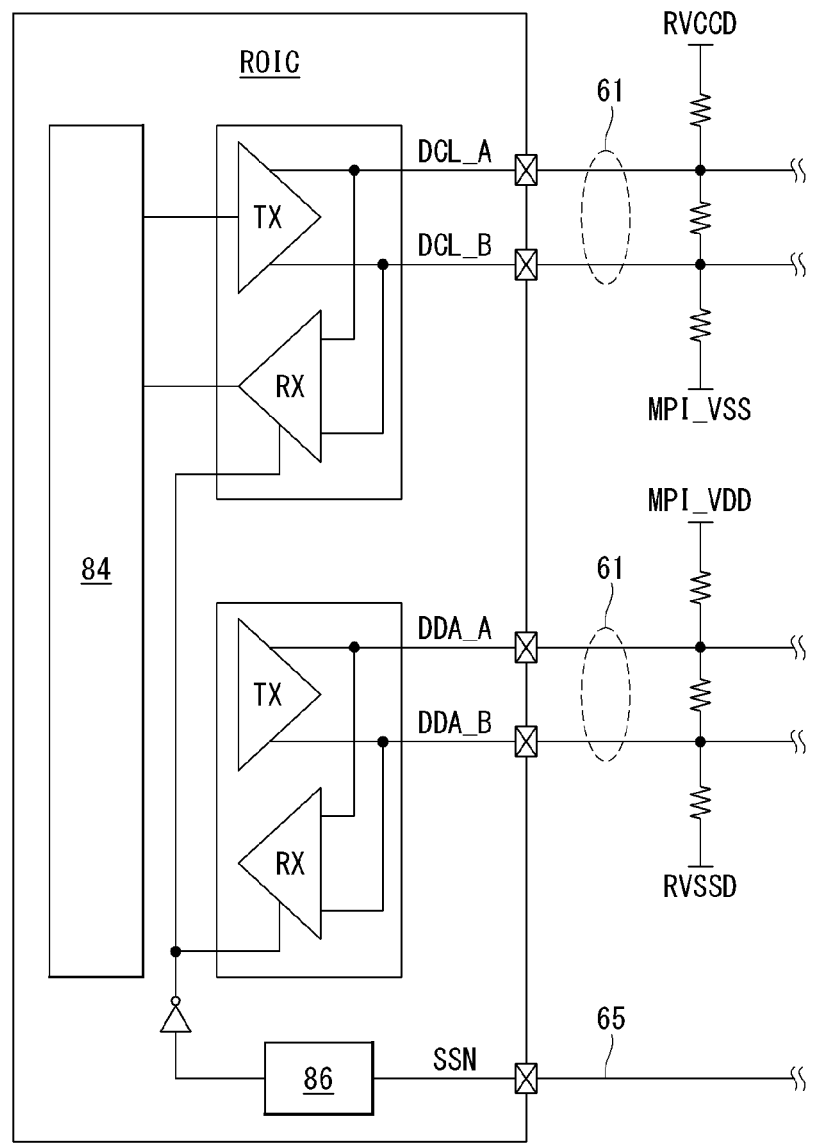
FIG. 26 is a view illustrating a receiver controller for controlling ON/OFF of RX buffers according to an SSN signal according to an embodiment of the present disclosure.

FIG. 23 is a view illustrating a signal transmission device according to another embodiment of the present disclosure. FIG. 24 is a view illustrating transmission/reception states of MCU and ROICs according to a slave selection signal (hereinafter referred to as "SSN signal"). FIG. 25 is a view illustrating states of RX buffers of ROICs and an MCU according to an SSN signal. FIG. 26 is a view illustrating a receiver controller for controlling ON/OFF of RX buffers according to an SSN signal.

Referring to FIGS. 23 to 26, the signal transmission device of the present disclosure transmits and receives touch data through lines connecting ROICs ROIC #1 to ROIC #4 and an MCU in a multi-point or multi-drop form. The lines include a clock line pair 61 to which a clock of a differential signal is transmitted, a data line pair 62 to which data of a differential signal is transmitted, and a line 65 to which an SSN signal generated as a TTL signal is transmitted. The line 65 is connected in a multi-point form between the MCU and the ROICs. Thus, the MCU and the ROICs share the single line 65 through which the SSN signal is transmitted.

A data packet transmitted through the data line pair 62 between the MCU and the ROICs ROIC #1 to ROIC #4 includes a header interval, a register address interval, and a data interval allocated between a start dummy clock and an end dummy clock.

When the SSN signal has the second logical value (Low=0), the MCU operates in the transmission mode TX and all the ROICs operate in the reception mode RX. When the SSN signal has the first logical value (High=1), a ROIC selected by the MCU operates in the transmission mode TX and the MCU operates in the reception mode RX. The MCU may select the ROIC to which the touch data is to be transmitted by a command code transmitted during the header interval. When the SSN signal has the first logical value (High=1), the RX buffers 75 and 77 of the ROICs are controlled to the idle mode. The receiver controller 86 of the ROICs turns off power of the RX buffers 75 and 77 in response to the SSN signal having the first logical value to control the RX buffers 75 and 77 to the idle mode. In response to the SSN signal having the second logical value, the receiver controller 86 applies power to the RX buffers 75 and 77 in all the ROICs and controls the RX buffers 75 and 77 in the active mode.

In the present disclosure, as illustrated in FIG. 25, power of the RX buffers 75 and 77 in the ROICs other than the ROIC operating in the transmission mode TX using the SSN signal is cut off to control the corresponding RX buffers 75 and 77 to the idle mode. As a result, in the present disclosure, current consumption of the RX buffers 75 and 77 may be reduced by driving the RX buffers 75 and 77 only when necessary and the reflected waves propagating to the ROICs near the ROIC operating in the transmission mode TX are blocked to minimize an influence of the reflected waves, thus guaranteeing signal integrity between the MCU and the ROICs.

FIG. 27 is a view illustrating a simulation of the embodiment illustrated in FIGS. 23 to 26. In FIG. 27, DDA_A is differential data. DCL_A is a differential clock. SRIC0 is the ROIC of the first SRIC. MPI0_RX_Power is a RX Power Status of ROIC. MPI0_TX_Power is TX Power Status of ROIC. MSPI0_SSN is the SSN applied to the ROIC of the first SRIC. The SSN signal is simultaneously applied to all the SRICs 200 via the line 65 in the multi-point form.

The SRIC1 to SRIC3 are the second to fourth SRICs. Rx_c_state [2:0] is RX buffer status. Rx_c_state [2:0] is activated when the SSN signal is in the second logical interval (Low=0). When the SSN signal is in the first logical interval (High=1), the SRICs are sequentially switched to the transmission mode TX in order of SRIC0 to SRIC3 according to MCU selection to transmit touch data to the MCU. In this simulation, results of checking an eye diagram of a signal received at the SRIC confirms integrity because all the signals were read.

As described above, the signal transmission device of the present disclosure connects the MCU and the plurality of ROICs (or SRICs) through the lines in the multi-point or multi-drop form and transmits a differential signal in which a command or data is encoded through the lines through two-way communication. As a result, the present disclosure may significantly reduce the number of lines between the MCU and the ROICs and reduce EMI effects. For example, since a clock and data may be transmitted as differential signals between the MCU and the ROICs, data may be transmitted to and received from the MCU by only four pins. When the MCU and six ROICs are connected, the MCU requires only four pins. A line to which a reset signal for ROIC initialization is applied may be added between the MCU and the ROICs. Since a command for defining a transmission/reception mode between the MCU and the ROICs and a command code for defining the ROIC selection number, and the like, are transmitted, a separate pin or signal required for two-way communication is not necessary.

According to the present disclosure, since the number of pins of the MCU required for two-way communication between the MCU and ROICs is reduced and the number of lines between the MCU and the ROICs is reduced, the size of the ROICs may be reduced and a bezel area including a line on glass (OLG) area on the board on which the ROICs are arranged may be reduced, and also, since a width of the line is increased by the reduction in the number of lines, line resistance may be reduced.

The signal transmission device of the present disclosure wakes up the RX buffers to switch them to an ON state and controls ON/OFF of the RX buffers during the touch sensing period, only when a change of a reset signal or a lock signal is detected or only when data reception is required using a slave selection signal (SSN), rather than keeping the RX buffers of the ROICs in an ON state. Therefore, the signal transmission device of the present disclosure may realize an attention function of the RX buffers without using additional pins and lines for ON/OFF of the RX buffers, and may control the ON/OFF of the RX buffers.

Since the RX buffers are driven only when necessary, current consumption of the ROICs may be reduced and the influence of the reflected waves propagating to the ROICs other than the ROIC which transmits touch data. Furthermore, the present disclosure may guarantee signal integrity between the MCU and the ROICs by minimizing the influence of reflected waves.

The signal transmission device according to the present disclosure may provide two-way communication between the MCU and the ROICs capable of improving an increase in a touch data transmission amount according to an increase in the size of touch screens and application of active pens and signal-interference characteristics (mains-interference immunity) such as external radio noise, and the like.

The present disclosure is applicable to various touch sensor devices and display devices that require two-way communication between the MCU and ROICs as well as to the in-cell touch panel.

A signal transmission device and a display device using the same according to various embodiments of the disclosure may be described as follows.

The signal transmission device comprises a plurality of integrated circuits driving touch sensors and outputting a touch data obtained from the touch sensors; a controller controlling the integrated circuits and determining a touch input on the basis of the touch data received from the integrated circuits; and a plurality of lines connecting the controller and the integrated circuits in a multi-point manner. The controller and the integrated circuits communicate with each other in both directions via the lines. A data packet of differential signal transmitted between the controller and the integrated circuits includes a header interval, a register address interval, and a data interval allocated between a start dummy clock and an end dummy clock. The header interval defines a reception mode and a transmission mode of the integrated circuits and the controller and a data length to be transmitted in the data interval. The register address interval defines a read or write start address of the data to be transmitted in the data interval.

The header interval further includes a device address code identifying each of the integrated circuits and a code defining a data length to be transmitted in the data interval.

The header interval includes a command generated by the controller and individually selecting the integrated circuits or collectively selecting the entire integrated circuits.

Each of the integrated circuits comprises: a first reception buffer receiving the differential signal including the data packet; a second reception buffer receiving a differential signal including a clock synchronized with the data packet; and a receiver controller controlling ON/OFF of at least one of the first and second reception buffers through any one of the lines.

Any one of the lines is a reset signal line simultaneously applying a reset signal generated by the controller to the integrated circuits. The integrated circuits are reset when a specific logical interval of the reset signal is a predetermined reference time or greater.

The receiver controller wakes up the second reception buffer when the specific logical interval of the reset signal is smaller than the predetermined reference time.

The receiver controller wakes up the first reception buffer when the start dummy clock is received, and switches the first reception buffer to an OFF state when the end dummy clock is received.

When an integrated circuit selected by the controller from among the integrated circuits transmits the touch data to the controller, the second reception buffers of the other remaining integrated circuits are in an OFF state.

Any one of the lines is a line simultaneously applying a slave selection signal generated by the controller to the integrated circuits. When the slave selection signal has a first logical value, the receiver controller cuts off power of the reception buffers to control the reception buffers to an idle mode. When the slave selection signal has a second logical value, the receiver controller applies power to the reception buffers of all the integrated circuits to control the reception buffers to an active mode.

An integrated circuit selected by the controller according to a command of the header interval operates in a transmission mode and the controller operates in a reception mode when the slave selection signal has the first logical value. The receiver controller controls the reception buffers of the integrated circuits to the idle state when the slave selection signal has the first logical value.

When the slave selection signal has the second logical value, the controller operates in the transmission mode and the integrated circuits operate in the reception mode.

The display device comprises data integrated circuits writing pixel data of an input image into pixels; a plurality of touch sensing integrated circuits driving touch sensors to output touch data obtained from the touch sensors; a touch sensing controller controlling the integrated circuits and determining a touch input on the basis of the touch data received from the integrated circuits; a timing controller transmitting the pixel data of the input image to the data integrated circuits and supplying a synchronization signal defining a display interval during which the pixels are driven and a touch sensing period during which the touch sensors are driven to the touch sensing controller; and a plurality of lines connecting the touch sensing controller and the touch sensing integrated circuits in a multi-point manner. The touch sensing controller and the touch sensing integrated circuits communicate with each other in both directions via the lines. A data packet of differential signal transmitted between the touch sensing controller and the touch sensing integrated circuits includes a header interval, a register address interval, and a data interval allocated between a start dummy clock and an end dummy clock. The header interval defines a reception mode and a transmission mode of the touch sensing integrated circuits and the touch sensing controller and a data length to be transmitted in the data interval. The register address interval defines a read or write start address of the data to be transmitted in the data interval.

Each of the touch sensing integrated circuits comprises: a first reception buffer receiving the differential signal including the data packet; a second reception buffer receiving a differential signal including a clock synchronized with the data packet; and a receiver controller controlling ON/OFF of at least one of the first and second reception buffers through any one of the lines.

Any one of the lines is a reset signal line simultaneously applying a reset signal generated by the touch sensing controller to the touch sensing integrated circuits. The touch sensing integrated circuits are reset when a specific logical interval of the reset signal is a predetermined reference time or greater.

The receiver controller wakes up the second reception buffer when the specific logical interval of the reset signal is smaller than the predetermined reference time.

When a touch sensing integrated circuit selected by the touch sensing controller from among the touch sensing integrated circuits operates in a transmission mode and transmits the touch data to the touch sensing controller, the second reception buffers of the other remaining touch sensing integrated circuits are in an OFF state.

Each of the data integrated circuits comprises: a clock restoring unit receiving a clock internal data received from the timing controller, restoring the clock, and generating an internal clock; and a lock checking unit transmitting a lock signal having a first logical value to the timing controller when a phase of the internal clock is locked.

The display device further comprises a receiver controller controlling ON/OFF of the second reception buffer in response to the lock signal; and a wake-up controller supplying a wake-up signal to the lock checking unit. The lock checking unit toggles the lock signal to a second logical value for a time smaller than a predetermined reference time in response to the wake-up signal. The receiver controller wakes up the second reception buffer when the lock signal is toggled.

Any one of the lines is a line simultaneously applying a slave selection signal generated by the touch sensing controller to the touch sensing integrated circuits. When the slave selection signal has a first logical value, the receiver controller cuts off power of the reception buffers to control the reception buffers to an idle mode. When the slave selection signal has a second logical value, the receiver controller applies power to the reception buffers of all the touch sensing integrated circuits to control the reception buffers to an active mode.

A touch sensing integrated circuit selected by the touch sensing controller according to a command of the header interval operates in a transmission mode and the touch sensing controller operates in a reception mode when the slave selection signal has the first logical value. The receiver controller controls the reception buffers of the touch sensing integrated circuits to the idle state when the slave selection signal has the first logical value.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A signal transmission device comprising:
   a plurality of integrated circuits driving touch sensors and outputting a touch data obtained from the touch sensors;
   a controller controlling the plurality of integrated circuits and determining a touch input on a basis of the touch data received from the plurality of integrated circuits; and
   a plurality of lines connecting the controller and the plurality of integrated circuits in a multi-point manner,
   wherein the controller and the plurality of integrated circuits communicate with each other in both directions via the lines,
   a data packet of differential signal transmitted between the controller and the plurality of integrated circuits includes a header interval, a register address interval, and a data interval allocated between a start dummy clock and an end dummy clock,
   the header interval defines a reception mode and a transmission mode of the plurality of integrated circuits and the controller and a data length to be transmitted in the data interval, and
   the register address interval defines a read or write start address of the data to be transmitted in the data interval,
   wherein each of the plurality of integrated circuits comprises:
      a first reception buffer receiving the differential signal including the data packet;
      a second reception buffer receiving a differential signal including a clock synchronized with the data packet; and
      a receiver controller controlling ON/OFF of at least one of the first and second reception buffers through any one of the lines,
      wherein any one of the lines is a reset signal line simultaneously applying a reset signal generated by the controller to the plurality of integrated circuits, and the plurality of integrated circuits are reset when a specific logical interval of the reset signal is a predetermined reference time or greater,
      wherein the receiver controller wakes up the second reception buffer when the specific logical interval of the reset signal is smaller than the predetermined reference time.

2. The signal transmission device of claim 1, wherein the header interval further includes a device address code identifying each of the plurality of integrated circuits and a code defining a data length to be transmitted in the data interval.

3. The signal transmission device of claim 1, wherein the header interval includes a command generated by the controller and individually selecting the plurality of integrated circuits or collectively selecting the plurality of integrated circuits.

4. The signal transmission device of claim 1, wherein the receiver controller wakes up the first reception buffer when the start dummy clock is received, and switches the first reception buffer to an OFF state when the end dummy clock is received.

5. The signal transmission device of claim 1, wherein
when an integrated circuit selected by the controller from among the plurality of integrated circuits transmits the touch data to the controller, the second reception buffers of the other plurality of integrated circuits except the selected integrated circuit are in an OFF state.

6. A signal transmission device comprising:
a plurality of integrated circuits driving touch sensors and outputting a touch data obtained from the touch sensors;
a controller controlling the plurality of integrated circuits and determining a touch input on a basis of the touch data received from the plurality of integrated circuits; and
a plurality of lines connecting the controller and the plurality of integrated circuits in a multi-point manner,
wherein the controller and the plurality of integrated circuits communicate with each other in both directions via the lines,
a data packet of differential signal transmitted between the controller and the plurality of integrated circuits includes a header interval, a register address interval, and a data interval allocated between a start dummy clock and an end dummy clock,
the header interval defines a reception mode and a transmission mode of the plurality of integrated circuits and the controller and a data length to be transmitted in the data interval, and
the register address interval defines a read or write start address of the data to be transmitted in the data interval,
wherein each of the plurality of integrated circuits comprises:
a first reception buffer receiving the differential signal including the data packet;
a second reception buffer receiving a differential signal including a clock synchronized with the data packet; and
a receiver controller controlling ON/OFF of at least one of the first and second reception buffers through any one of the lines,
wherein any one of the lines is a line simultaneously applying a slave selection signal generated by the controller to the plurality of integrated circuits, and
when the slave selection signal has a first logical value, the receiver controller cuts off power of the first and second reception buffers to control the first and second reception buffers to an idle mode, and
when the slave selection signal has a second logical value, the receiver controller applies power to the first and second reception buffers of all the plurality of integrated circuits to control the first and second reception buffers to an active mode.

7. The signal transmission device of claim 6, wherein
an integrated circuit selected by the controller from among the plurality of integrated circuits according to a command of the header interval operates in a transmission mode and the controller operates in a reception mode when the slave selection signal has the first logical value, and
the receiver controller controls the first and second reception buffers of the plurality of integrated circuits to an idle state when the slave selection signal has the first logical value.

8. The signal transmission device of claim 7, wherein
when the slave selection signal has the second logical value, the controller operates in the transmission mode and the plurality of integrated circuits operate in the reception mode.

9. A display device comprising:
data integrated circuits writing pixel data of an input image into pixels;
a plurality of touch sensing integrated circuits driving touch sensors to output touch data obtained from the touch sensors;
a touch sensing controller controlling the plurality of touch sensing integrated circuits and determining a touch input on a basis of the touch data received from the plurality of touch sensing integrated circuits;
a timing controller transmitting the pixel data of the input image to the data integrated circuits and supplying a synchronization signal defining a display interval during which the pixels are driven and a touch sensing period during which the touch sensors are driven to the touch sensing controller; and
a plurality of lines connecting the touch sensing controller and the plurality of touch sensing integrated circuits in a multi-point manner,
wherein the touch sensing controller and the plurality of touch sensing integrated circuits communicate with each other in both directions via the lines,
a data packet of differential signal transmitted between the touch sensing controller and the plurality of touch sensing integrated circuits includes a header interval, a register address interval, and a data interval allocated between a start dummy clock and an end dummy clock,
the header interval defines a reception mode and a transmission mode of the plurality of touch sensing integrated circuits and the touch sensing controller and a data length to be transmitted in the data interval, and
the register address interval defines a read or write start address of the data to be transmitted in the data interval,
wherein each of the plurality of touch sensing integrated circuits comprises:
a first reception buffer receiving the differential signal including the data packet;
a second reception buffer receiving a differential signal including a clock synchronized with the data packet; and
a receiver controller controlling ON/OFF of at least one of the first and second reception buffers through any one of the lines,
wherein any one of the lines is a reset signal line simultaneously applying a reset signal generated by the touch sensing controller to the plurality of touch sensing integrated circuits, and the plurality of touch sensing integrated circuits are reset when a specific logical interval of the reset signal is a predetermined reference time or greater, and
wherein the receiver controller wakes up the second reception buffer when the specific logical interval of the reset signal is smaller than the predetermined reference time.

10. The display device of claim 9, wherein
when a touch sensing integrated circuit selected by the touch sensing controller from among the plurality of touch sensing integrated circuits operates in a transmission mode and transmits the touch data to the touch sensing controller, the second reception buffers of the other touch sensing integrated circuits except the selected touch sensing integrated circuit are in an OFF state.

11. The display device of claim 9, wherein
each of the data integrated circuits comprises:
a clock restoring unit receiving a clock internal data received from the timing controller, restoring the clock, and generating an internal clock; and
a lock checking unit transmitting a lock signal having a first logical value to the timing controller when a phase of the internal clock is locked.

12. The display device of claim 11, further comprising:
a receiver controller controlling ON/OFF of the second reception buffer in response to the lock signal; and
a wake-up controller supplying a wake-up signal to the lock checking unit,
wherein the lock checking unit toggles the lock signal to a second logical value for a time smaller than a predetermined reference time in response to the wake-up signal, and
the receiver controller wakes up the second reception buffer when the lock signal is toggled.

* * * * *